US011800499B1

(12) United States Patent
Assao et al.

(10) Patent No.: US 11,800,499 B1
(45) Date of Patent: Oct. 24, 2023

(54) SMART PERSONAL AREA NETWORK MANAGEMENT

(71) Applicant: Amazon Technologies, Inc., Seattle, WA (US)

(72) Inventors: Sunil Felix Assao, Livermore, CA (US); Chiu Ngok Eric Wong, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 197 days.

(21) Appl. No.: 17/205,598

(22) Filed: Mar. 18, 2021

(51) Int. Cl.
*H04W 48/16* (2009.01)
*H04W 72/0446* (2023.01)

(52) U.S. Cl.
CPC ....... *H04W 72/0446* (2013.01); *H04W 48/16* (2013.01)

(58) Field of Classification Search
CPC .......................... H04W 72/0446; H04W 48/16
USPC ......................................................... 370/336
See application file for complete search history.

(56) References Cited

U.S. PATENT DOCUMENTS

| 2010/0111050 | A1* | 5/2010 | Jeong | H04B 7/2656 |
| | | | | 370/336 |
| 2014/0016581 | A1* | 1/2014 | Jeon | H04W 72/20 |
| | | | | 370/329 |
| 2016/0174218 | A1* | 6/2016 | Stanescu | H04W 76/15 |
| | | | | 370/336 |
| 2019/0037506 | A1* | 1/2019 | Singh | H04W 72/0446 |
| 2019/0349786 | A1* | 11/2019 | Hett | H04W 24/02 |
| 2022/0240164 | A1* | 7/2022 | Hett | G06F 9/4401 |

OTHER PUBLICATIONS

Umer, Javed, et al., "Frequency hopping in IEEE 802.15. 4 to mitigate IEEE 802.11 interference and fading," Journal of Systems Engineering and Electronics, 29.3 (Jun. 2018): 445-455, URL: https://ieeexplore.ieee.org/stamp/stamp.isp?tp=&arnumber= 8406341.
Watteyne, Thomas, Maria-Rita Palattella, and Luigi Alfredo Grieco, "Using IEEE 802.15. 4e Time-Slotted Channel Hopping (TSCH) in the internet of things (IoT): Problem Statement." Internet Engineering Task Force (May 2015), Informational, 23 pages.

* cited by examiner

*Primary Examiner* — Faisal Choudhury
(74) *Attorney, Agent, or Firm* — Athorus, PLLC

(57) ABSTRACT

Two or more personal area networks (or PANs) operating channel hopping schedules may be operated within a vicinity of one another with channel hopping schedules according to IEEE 802.15.4 that are separated by a frequency offset, and collisions between data transmitted by the respective devices of the networks may be avoided. Nodes of a first PAN transmit beacons identifying information regarding a first communications schedule. A node of a second PAN receives the beacon and establishes a second channel hopping schedule at the offset from the first communications schedule. Nodes of PANs may be programmed with communication modes that vary uplink or downlink slots based on quality-of-service or traffic requirements.

15 Claims, 18 Drawing Sheets

SMART PERSONAL AREA NETWORK MANAGEMENT

BACKGROUND

In some networks, such as personal area networks (or "PAN"), time-slotted channel hopping (or "TSCH," sometimes called time-synchronized channel hopping), is a medium access control ("MAC") that is intended to coordinate all transmissions of packets (e.g., data) between nodes of the networks. Cells designated for nodes to transmit data within a PAN may hop in tandem over a set of channels, defined by a communications schedule or frequency plan that covers a plurality of timeslots that repeat over time, e.g., in a slotframe. All frame transmissions within a PAN occur in selected channels of the set of channels and in designated timeslots of the slotframe according to the communications schedule. Each cell of a communications schedule may correspond to a link between nodes of the PAN, which may be dedicated to communications between two specific nodes, or shared (or open) to communications between any numbers of nodes. When a node joins a PAN, the node is allocated a number of timeslots for communications with a coordinator node, or with any other nodes of the PAN.

Because the number of channels and timeslots available for time-slotted channel hopping is finite, every PAN has a theoretical maximum number of nodes that may be added. Accordingly, in some instances, where a large number of nodes are provided and operating within a close proximity of one another, there is a possibility that nodes in two or more adjacent PANs may operate at a common frequency and in a time domain, thereby potentially causing collisions and losses of packets. While time-slotted channel hopping itself is intended to avoid collisions or losses during communications between nodes of a PAN, to date, limiting or eliminating a risk of collisions or packet loss during transmissions within adjacent PANs that occur within common channels and during common timeslots has not been possible.

Moreover, the links set forth in a communications schedule for a PAN are typically rigidly defined with respect to nodes of the PAN. Where a PAN includes a plurality of nodes, each having various functions or traffic requirements that may change over time, however, a communications schedule is typically incapable of adjusting to variations in such functions or traffic requirements during operation of the PAN.

DETAILED DESCRIPTION

Figure 1A:
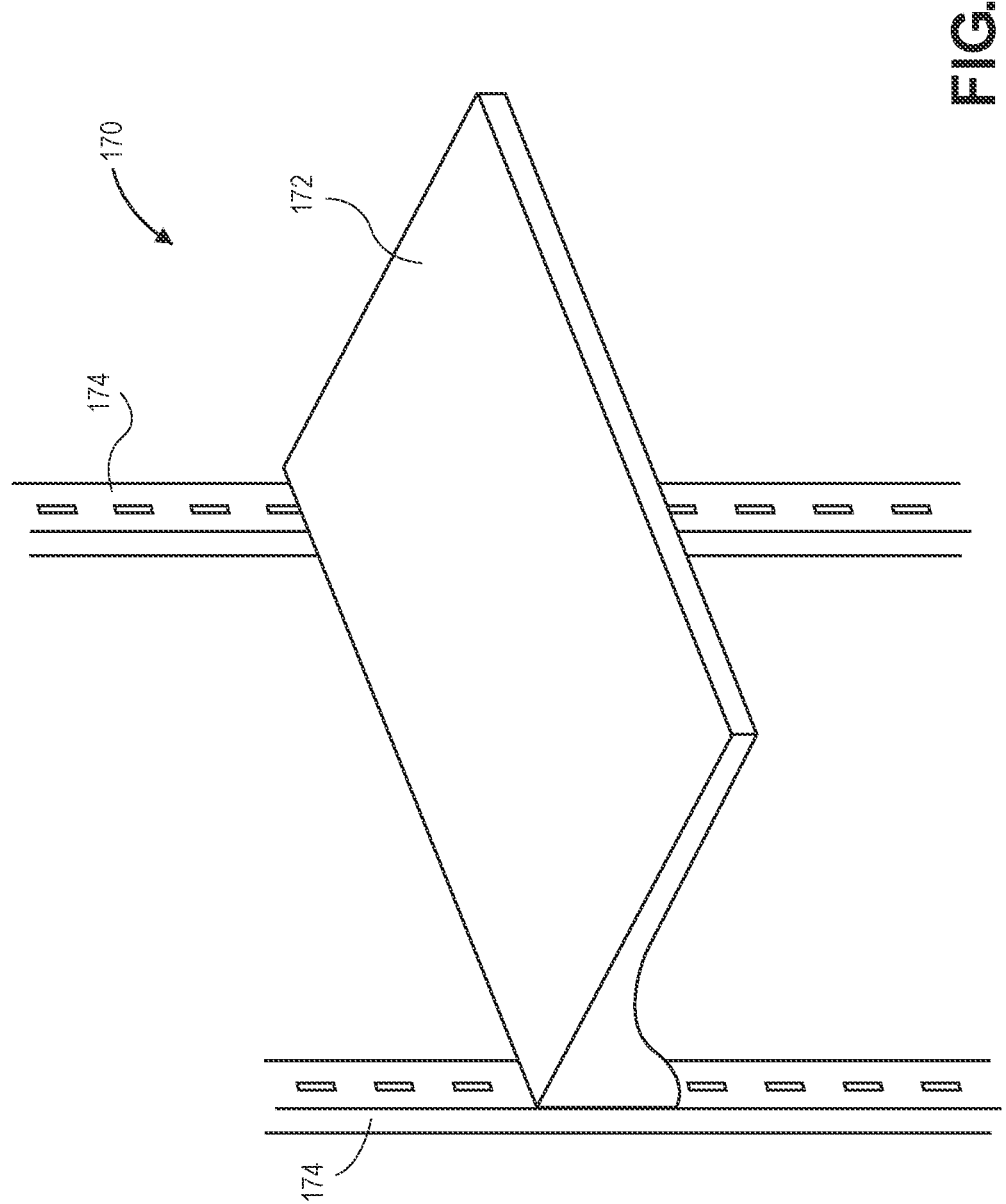
FIGS. 1A through 1G are views of aspects of one system for network management in accordance with implementations of the present disclosure.

As is set forth in greater detail below, the present disclosure is directed to managing the operations of networks, such as personal area networks, or PANs. More specifically, in some implementations, the systems and methods of the present disclosure are directed to operations of two or more networks, each having a coordinator and any number of nodes, within a close proximity of one another. A first network (e.g., a first PAN) may be formed by a first plurality of nodes, which may be devices of any type or kind that are configured for communication by a first schedule established in accordance with a channel hopping protocol, e.g., a TSCH protocol. The first schedule of the first network may be advertised to nodes of the first network or to other nodes by transmission of a first beacon, e.g., by a coordinator of the first network, or by one or more other nodes of the first network. The first beacon may include synchronization, channel hopping, or timeslot (or slotframe) or other information from a node within the first network.

A second network (e.g., a second PAN) may be formed within a close proximity of the first network, e.g., within an operational range or communication range of one or more of the nodes of the first network, when a node not within the first network receives the first beacon from a node within the first network. The node that is not within the first network may thus act as a coordinator for a second network and establish a second schedule in accordance with the channel hopping protocol. The second network may include the channels and timeslots of the first network, and may designate links that are provided at an offset (e.g., a frequency offset) with respect to links of the first schedule, but synchronized in time domain.

Nodes of the first network may continue to communicate with one another in accordance with the first schedule, within channels and timeslots dedicated to pairs of such nodes or shared by multiple nodes. In parallel, nodes may join the second network and communicate with one another in accordance with the second schedule, within channels that differ from those of the first schedule, e.g., separated by the offset, and within common timeslots. Additional networks may be formed by collections of nodes that receive the first beacon from nodes of the first network or a second beacon from nodes of the second network, and establish communications schedules with channels that are at offsets with respect to the first schedule and the second schedule, but synchronized in time domain.

Additionally, in some implementations, when a network (e.g., a PAN) is established, or when a node joins the network, one or more nodes may be programmed or configured to communicate with one another according to a plurality of communication modes. Each of the communication modes may allocate timeslots in a manner that satisfies one or more quality-of-service requirements (e.g., requirements relating to performance, availability, scalability, or serviceability, such as power consumption rates, timing, processing capacity, maintenance, or the like for a given node or other nodes) or traffic requirements (e.g., throughput, or managing, prioritizing, controlling an amount or a type of traffic, through one or more nodes of the network). For example, in one communication mode, e.g., a regular or normal operating communication mode, the nodes of a network may communicate in accordance with a schedule that includes channels and timeslots for uplinking and downlinking data at sufficiently short periodic intervals, or for intervals that are sufficient in number. In another communication mode, e.g., such as a mode during which updates of software or firmware of one of the nodes may be required, the nodes of the network may communicate in accordance with a schedule that includes significantly larger channels or numbers of timeslots for downlinking data than for uplinking data. In yet another communication mode, e.g., a mode during which communications may be less frequent due to limited or reduced operations in a location where the network is installed, the nodes of the network may communicate in accordance with a schedule that includes channels and timeslots for uplinking or downlinking data at extended or lengthy intervals, or for intervals that are limited in number, in order to conserve power, processing capacity or other resources of the network. The nodes of the network may be instructed to operate in one mode, or to transition to another mode, either upon receiving a beacon or another instruction from a coordinator or another node of the network or autonomously, e.g., upon sensing a change in operating conditions of the network or of any of the respective nodes. Moreover, where a network includes nodes of varying types, kinds, sizes or features, two or more of the nodes may operate in different communication modes, which may be selected based on their respective quality-of-service or traffic requirements, and a communications schedule of the network may be revised accordingly to reflect the differing communication modes.

Referring to FIGS. 1A through 1G, views of aspects of one system for network management in accordance with implementations of the present disclosure are shown. As is shown in FIG. 1A, a shelving unit 170 includes a shelf 172 or another loading surface mounted to a pair of supports 174 (e.g., a gondola rack or another system) in a substantially horizontal orientation or alignment. Alternatively, the shelving unit 170 may include any number of shelves or other loading surfaces, which may be provided in substantially horizontal orientations or alignments, such as the shelf 172 shown in FIG. 1A, or in any other orientations or alignments.

Figure 1B:
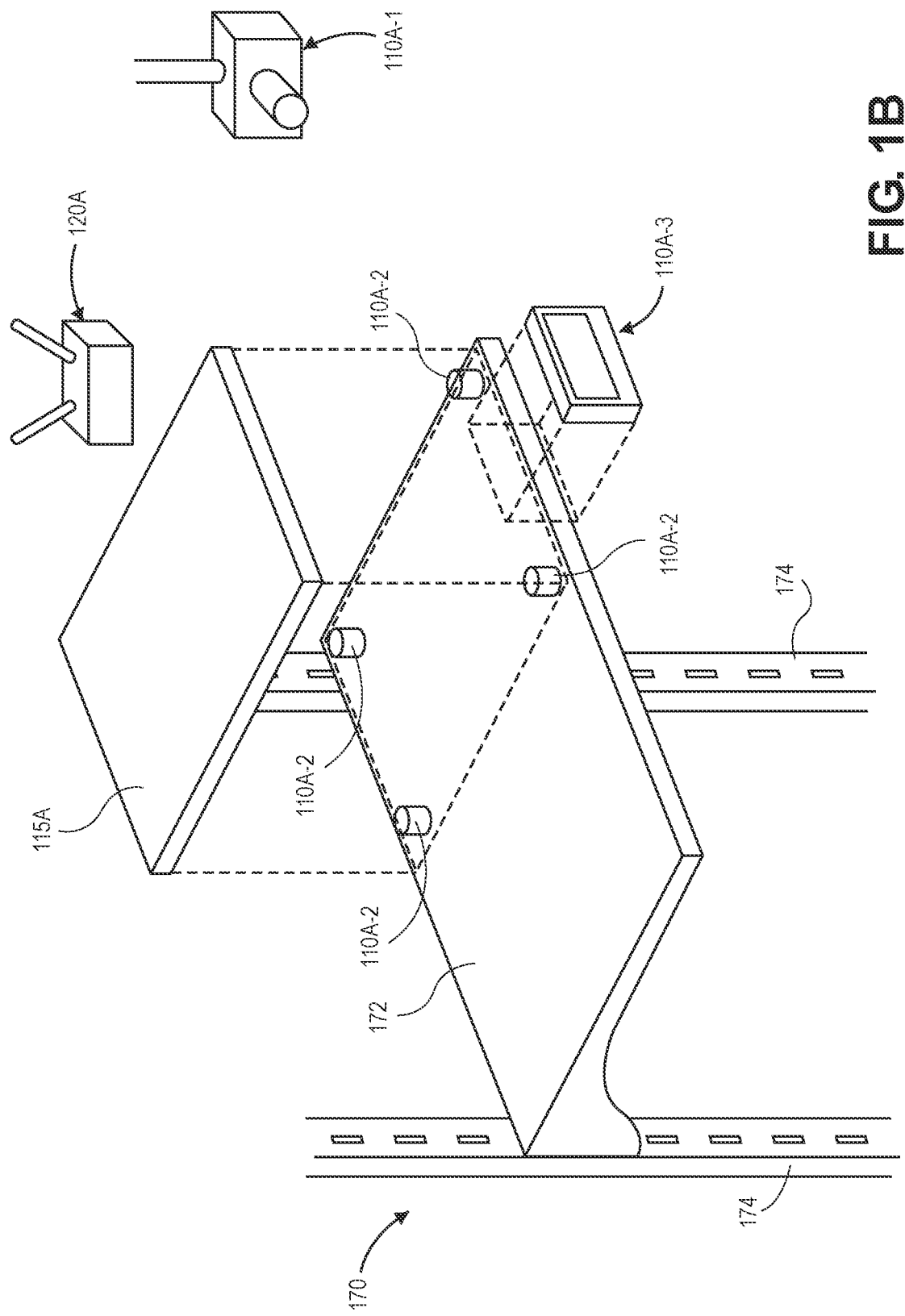

As is shown in FIG. 1B, a plurality of devices 110A-1, 110A-2, 110A-3, 120A are shown. The device 110A-1 is a camera or another imaging device configured to capture, process and/or store imaging data (e.g., visual images, depth images, or any other type of images) and, in some implementations, audio signals corresponding to the imaging data. The device 110A-1 may be further configured to transmit the imaging data to one or more monitors, stations or data stores (not shown) over one or more networks, e.g., by wired or wireless technologies or protocols, or to process the imaging data according to one or more algorithms, methods or techniques (e.g., a machine learning model or tool).

The devices 110A-2 are load sensors that are configured for sensing normal loads (e.g., vertical loads) on a platform 115A at discrete points, and may include one or more capacitive sensors, force-sensing resistors, strain gages, load cells, piezoelectric sensors, inductive weight sensors, or any other type or form of device or system for sensing a load thereon. As is shown in FIG. 1B, four of the devices 110A-2 are provided atop the shelf 172, and the platform 115A rests atop each of the devices 110A-2. Signals generated by the devices 110A-2 may be interpreted to detect changes or variations in loading on the platform 115A, and to determine a number of items, a type of the items, or a mass of one or more of the items, that are placed on or removed from the platform 115A due to such changes or variations in loading. The devices 110A-2 may also include one or more circuits or other components, and may be configured for communication by wired or wireless technologies or protocols. In some implementations, the devices 110A-2 may be configured to generate and transmit signals corresponding to loads sensed thereby at designated intervals, e.g., in one or more pulses rather than continuously, in order to reduce power or processing capacity consumed during operation. Additionally, in some implementations, the devices 110A-2 may be self-powered, e.g., with one or more batteries or power sources provided therein.

The devices 110A-3 are interactive displays, e.g., electronic shelf labels, that may be mounted in association with one or more shelves or other loading stations, e.g., the shelf 172 or the shelving unit 170, and configured to display information regarding one or more products that are placed thereon, or designated for placement thereon. The devices 110A-3 may include one or more displays or other types or forms of systems for electronically displaying information, including but not limited to an electronic ink display, a liquid crystal display (or "LCD"), a light-emitting diode (or "LED") display, or an organic light-emitting diode (or "OLED") display. The devices 110A-3 may be further configured to communicate over one or more networks, e.g., by wired or wireless technologies or protocols.

The device 120A is a gateway (or access point) that enables communication between one or more of the devices 110A-1, 110A-2, 110A-3 and one or more external networks (not shown), which may include the Internet in whole or in part. For example, the device 120A may be a wireless router, a "hot spot," an antenna system, or any other device or component that is configured to enable communication with one or more of such networks, e.g., by wired or wireless technologies or protocols.

Figure 1C:
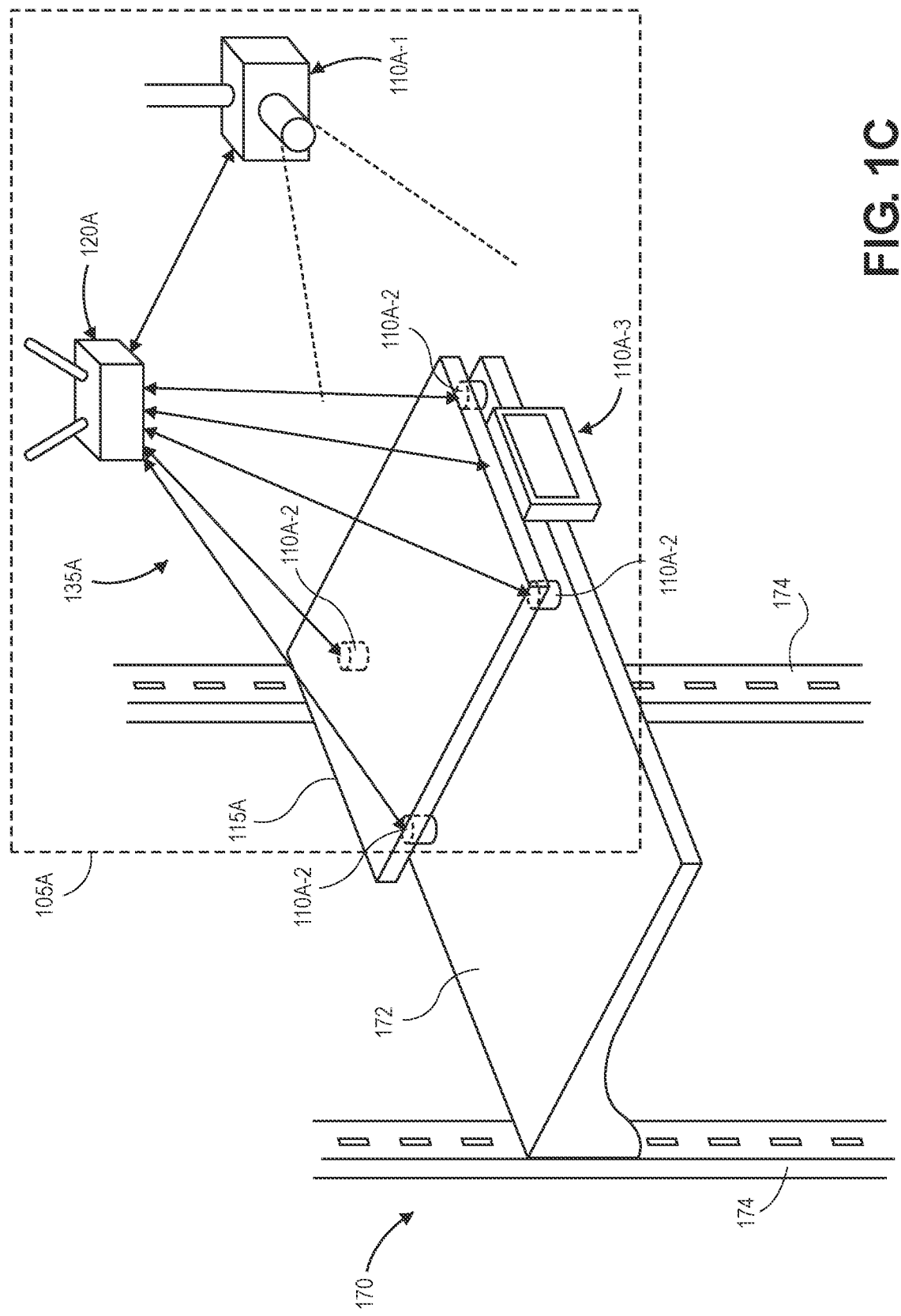

As is shown in FIG. 1C, a first personal area network (or PAN) 105A may be formed by the devices 110A-1, 110A-2, 110A-3 and the device 120A. The devices 110A-1, 110A-2, 110A-3 of the first PAN 105A may be mounted or installed, along with the platform 115A, in association with the shelving unit 170 and synchronized for wireless communication with the device 120A according to a communications schedule 135A, which may identify channels and timeslots designating links for communication between respective ones of the devices 110A-1, 110A-2, 110A-3 and the device 120A. Alternatively, in some implementations, the communications schedule 135A may identify channels and timeslots that permit communications between the respective devices 110A-1, 110A-2, 110A-3.

In some implementations, the first PAN 105A may include any number of nodes or devices of any type or form, and such nodes or devices need not be limited to cameras, load sensors, displays or gateways (or access points). For example, in some implementations, a network, e.g., a PAN, such as the first PAN 105A, may include not only cameras, load sensors or electronic shelf labels but also one or more cash registers, climate control devices (e.g., controllers such as thermostats or components such as heaters, air conditioners, humidifiers, fans or others), remote power switches, gate sensors, turnstiles, pedestals, security cameras, radiofrequency identification (or "RFID") transmitters or receivers, motion sensors, computer devices or systems (e.g., smartphone), proximity sensors, lighting components, or any other devices or systems that may be configured to communicate over one or more networks according to any protocol or standard.

Figure 1D:
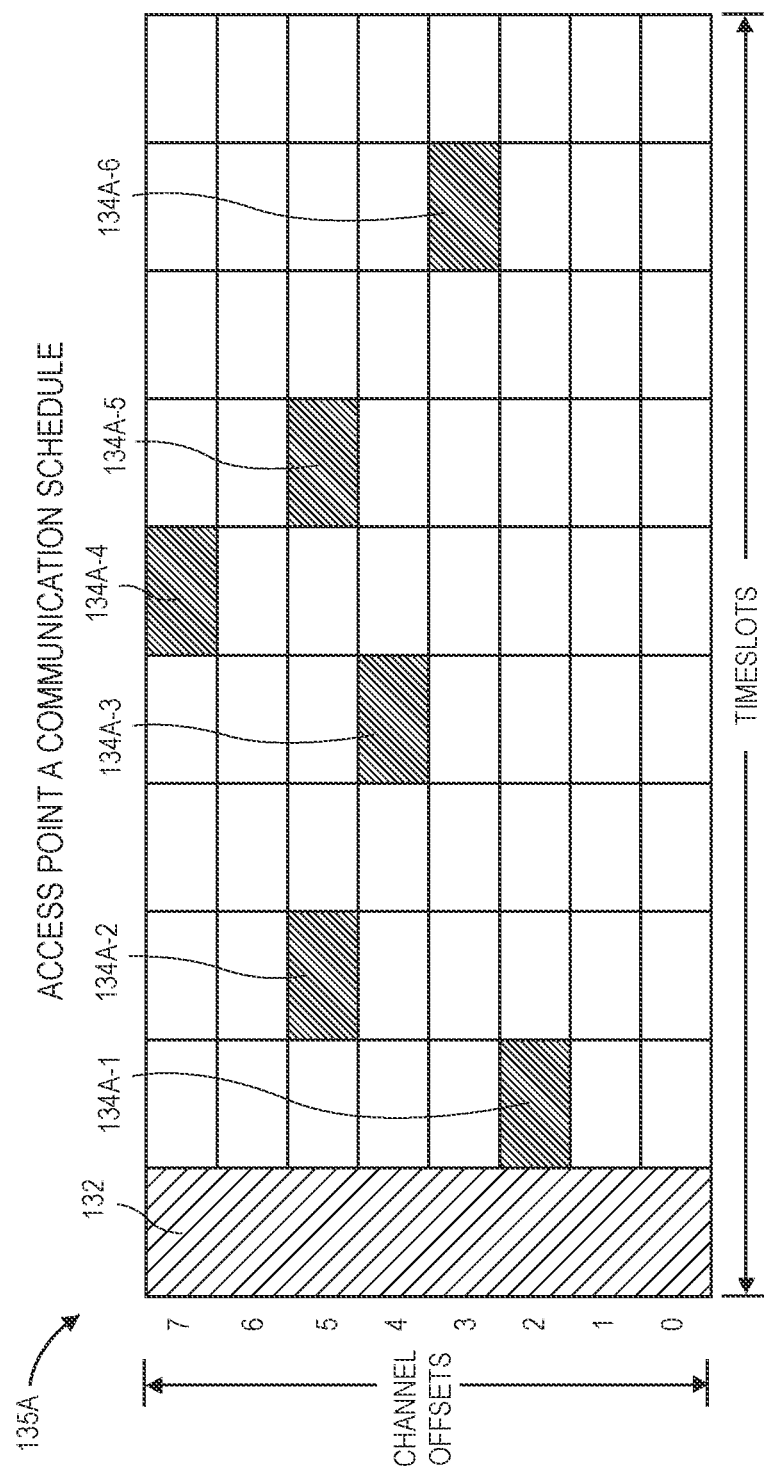

As is shown in FIG. 1D, the communications schedule 135A of the first PAN 105A is shown as a matrix having cells arranged in a number of rows, viz., eight, corresponding to channels (or channel offsets) and a number of columns, viz., ten, corresponding to timeslots (or slot offsets). Each of the cells of the communications schedule 135A shown in FIG. 1D represents a potential link between the device 120A and one of the devices 110A-1, 110A-2, 110A-3, and is either scheduled or unscheduled.

For example, as is shown in FIG. 1D, a shared cell 132 indicates that communication is enabled between any of the devices 110A-1, 110A-2, 110A-3 or the device 120A, e.g., in a common (e.g., shared) timeslot. Additionally, a plurality of cells 134A-1, 134A-2, 134A-3, 134A-4, 134A-5, 134A-6 correspond to links between the device 120A and other devices, viz., the devices 110A-1, 110A-2, 110A-3, in various other channels and timeslots, such as in dedicated links. The channels or the timeslots of the shared cell 132 or the cells 134A-1, 134A-2, 134A-3, 134A-4, 134A-5, 134A-6 of the communications schedule 135A may be selected in any manner, e.g., randomly or pseudo-randomly, in a hopping sequence. The communications schedule 135A also shows various cells that are unscheduled, viz., designated neither as shared by multiple devices 110A-1, 110A-2, 110A-3, 120A nor dedicated to links between two of the devices 110A-1, 110A-2, 110A-3, 120A. The channels of the communications schedule 135A may represent communications within any frequency band and the timeslots of the communications schedule 135A may have any duration or width. For example, in some implementations, the channels may be provided within a band centered around a frequency within a frequency range between approximately nine hundred megahertz and approximately nine hundred fifty megahertz (900-950 MHz), such as between approximately nine hundred two megahertz and approximately nine hundred twenty-eight megahertz (902-928 MHz). In some other implementations, the channels may be provided within a band centered around a frequency within a frequency range between approximately eight hundred fifty megahertz and approximately eight hundred seventy-five megahertz (850-875 MHz), such as between approximately eight hundred sixty-three megahertz and approximately eight hundred seventy megahertz (863-870 MHz). In some implementations, the channels may be provided within a band centered around a frequency of approximately 2.4 gigahertz (GHz). Moreover, in some implementations, each of the timeslots may have a duration of approximately fifteen milliseconds (15 ms).

In accordance with implementations of the present disclosure, where a network, such as a PAN, is formed within a vicinity of another network, such as another PAN, the newly formed network may establish a communications schedule based on the communications schedule of the operating network, by selecting unscheduled cells of the communications schedule that are at an offset with respect to scheduled cells of the communications schedule of the operating network, but synchronized in time domain with the communications schedule of the operating network, and forming a communications schedule that utilizes the selected open channels at the offset with respect to such scheduled cells.

Figure 1E:
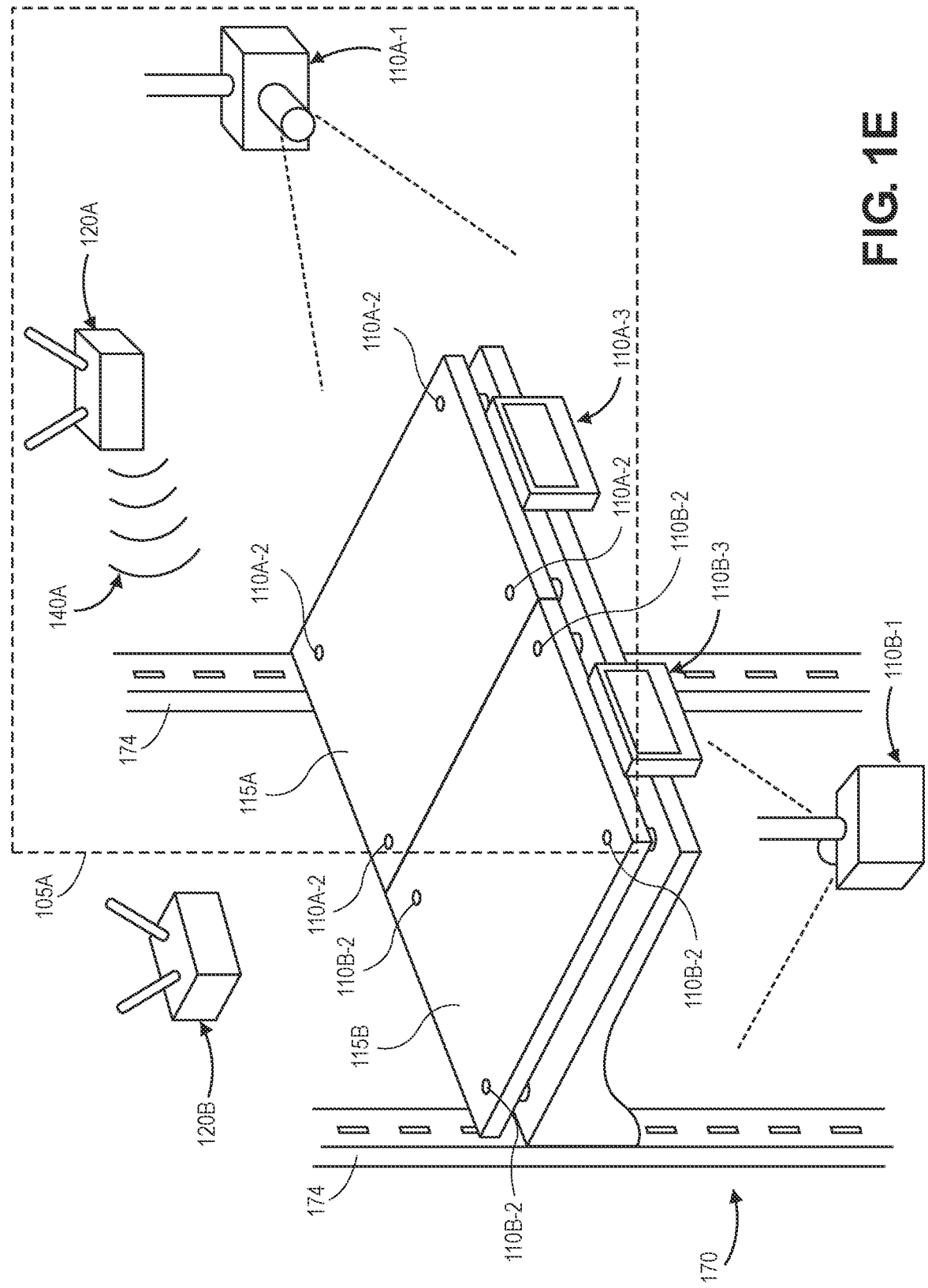

As is shown in FIG. 1E, a plurality of devices 110B-1, 110B-2, 110B-3, 120B are provided in association with the shelving unit 170. The device 110B-1 is a camera having one or more attributes or features in common with the device 110A-1 described herein, or one or more other properties. The devices 110B-2 are load sensors having one or more attributes or features in common with the devices 110A-2 described herein, or one or more other properties. Four of the devices 110B-2 are placed on the shelf 172, and a platform 115B rests atop each of the devices 110B-2. The device 110B-3 is a display having one or more attributes or features in common with the device 110A-3 described herein, or one or more other properties. The device 120B is a gateway having one or more properties in common with the device 120A described herein, or one or more other properties.

As is further shown in FIG. 1E, during operations of the first PAN 105A, the device 120A transmits a beacon 140A transmitted by the device 120A in accordance with the communications schedule 135A. For example, the beacon 140A may contain information regarding synchronization, channel hopping, or timeslots that are utilized by the device 120A or the devices 110A-1, 110A-2, 110A-3, including but not limited to information regarding the communications schedule 135A. In some implementations, the beacon 140A may be transmitted by the device 120A during or within the shared cell 132 shown in FIG. 1D. The beacon 140A may be intended to align or control the operations of the devices 110A-1, 110A-2, 110A-3, in accordance with the communications schedule 135A, and also to advertise the first PAN 105A or the communications schedule 135A to nodes or devices that are not associated or synchronized with the first PAN 105A.

Figure 1F:
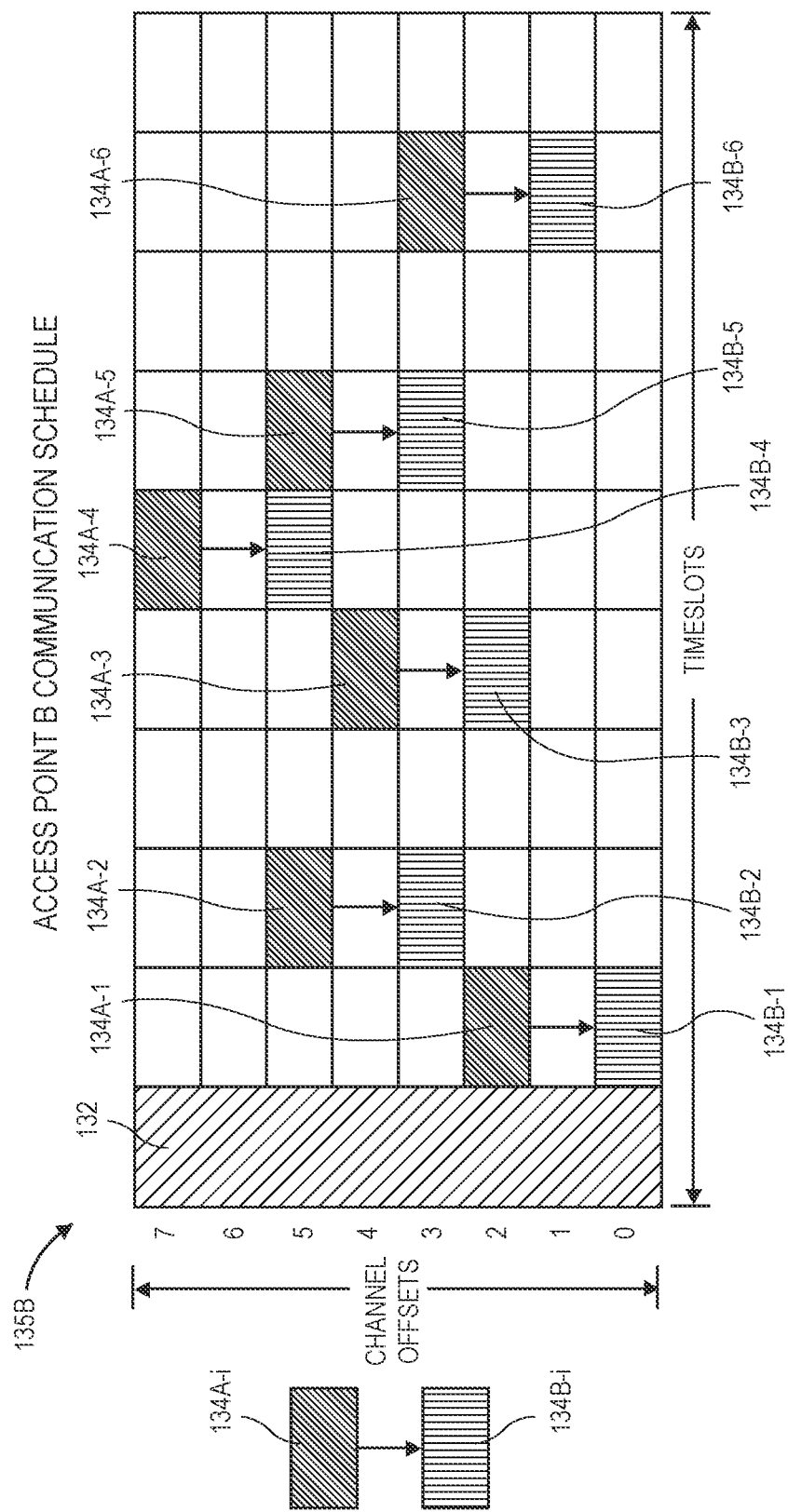

Upon receiving the beacon 140A, the device 120B may select an offset, e.g., a number of cells, and, as is shown in FIG. 1F, establish a communications schedule 135B for operating a personal area network with one or more other devices (e.g., nodes) based on the communications schedule 135A and the selected offset. For example, as is shown in FIG. 1F, the communications schedule 135B is shown as a matrix having a number of rows corresponding to channel offsets (or frequencies) and a number of columns corresponding to timeslots. Each of the cells of the communications schedule 135B represents a potential link between the device 120B and any number of other devices. For example, as is shown in FIG. 1F, the shared cell 132 of the communications schedule 135A may also be included within the communications schedule 135B, and indicates that communication is being enabled between any of the devices 110B-1, 110B-2, 110B-3 or the device 120B. Additionally, a plurality of cells 134B-1, 134B-2, 134B-3, 134B-4, 134B-5, 134B-6 correspond to links between the device 120B and other devices, viz., the devices 110B-1, 110B-2, 110B-3, in various other channels and timeslots, such as in dedicated links.

As is shown in FIG. 1F, representative ones of the plurality of cells 134B-i of the communications schedule 135B shown in FIG. 1F are provided at an offset selected by the device 120B based on the beacon 140A, e.g., a two-cell offset, from the representative ones of the plurality of cells 134A-i of the communications schedule 135A shown in FIG. 1D. For example, each of the plurality of cells 134B-1, 134B-2, 134B-3, 134B-4, 134B-5, 134B-6 of the communications schedule 135B is in a common timeslot with one of the plurality of cells 134A-1, 134A-2, 134A-3, 134A-4, 134A-5, 134A-6 of the communications schedule 135A, and with a two-cell offset.

Figure 1G:
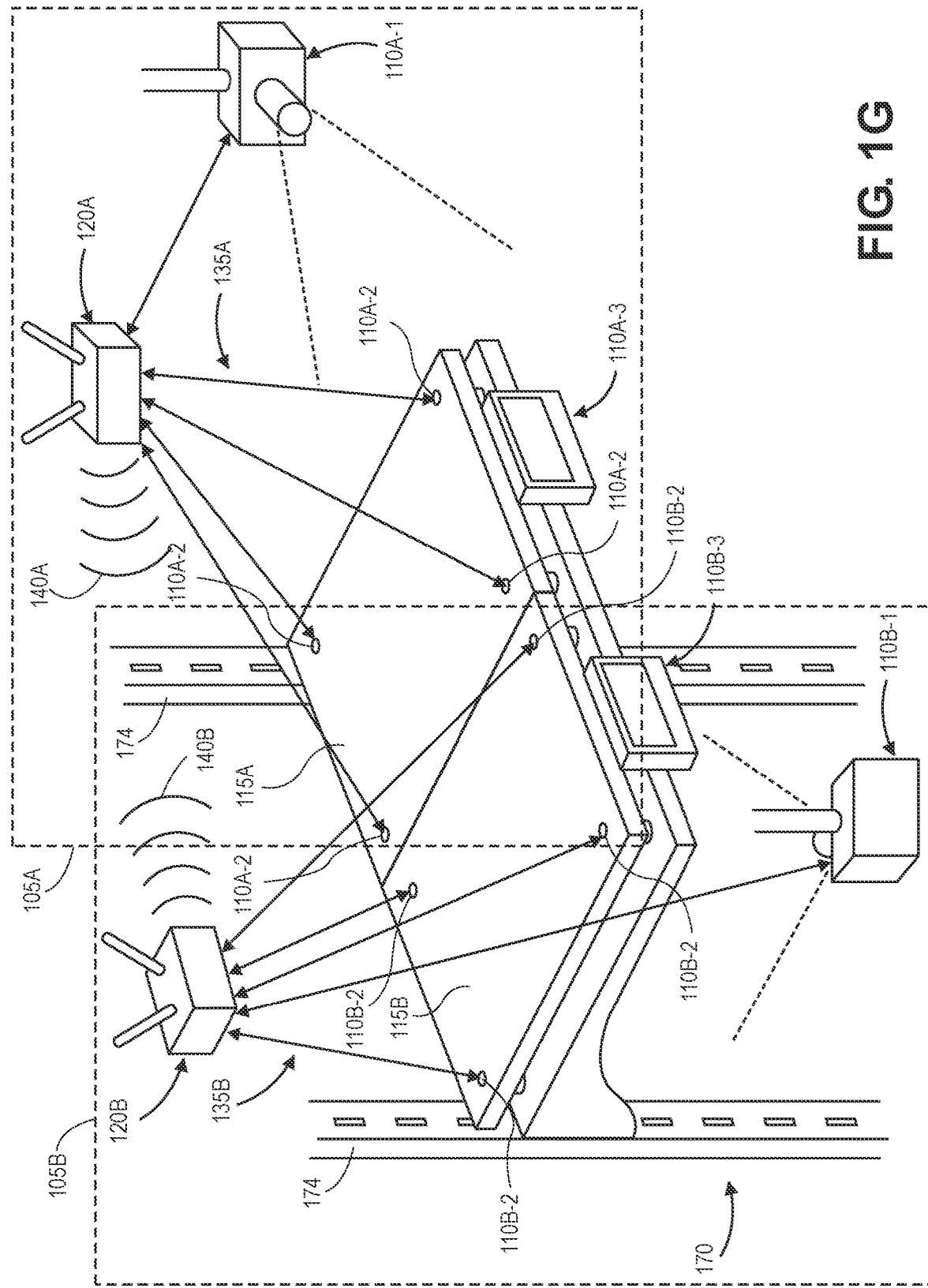

As is shown in FIG. 1G, a second PAN 105B is formed by the devices 110B-1, 110B-2, 110B-3 and the device 120B. The devices 110B-1, 110B-2, 110B-3 of the second PAN 105B may be mounted or installed along with the platform 115B in association with the shelving unit 170, adjacent to or near the devices 110A-1, 110A-2, 110A-3, the device 120A and the platform 115A. Each of the devices 110B-1, 110B-2, 110B-3 may be synchronized for wireless communication with the device 120B according to the communications schedule 135B. The device 120A may continue to transmit the beacon 140A in accordance with the communications schedule 135A, or may update the beacon 140A, as necessary, to include information regarding changes in the communications schedule 135A, or instructions to the device 120B or any other nodes of the second PAN 105B. The device 120B may likewise transmit a beacon 140B containing information regarding synchronization, channel hopping, or timeslots that are utilized by the device 120B or the devices 110B-1, 110B-2, 110B-3, including but not limited to information regarding the communications schedule 135B, e.g., during or within the shared cell 132 shown in FIG. 1F or at any other time. The beacon 140B may be intended to align or control the operations of the devices 110B-1, 110B-2, 110B-3, in accordance with the communications schedule 135B, and also to advertise the second PAN 105B or the communications schedule 135B to nodes or devices that are not associated or synchronized with the second PAN 105B. Additionally, upon receiving the beacon 140A from the device 120A or another node of the first PAN 105A, the device 120B may update one or more aspects of the communications schedule 135B, or provide any other instructions to any of the devices 110B-1, 110B-2, 110B-3.

Thus, despite their proximity, the devices of the first PAN 105A and the devices of the second PAN 105B may communicate with one another, without risk of collision or packet loss, due to the offset between the plurality of cells 134B-1, 134B-2, 134B-3, 134B-4, 134B-5, 134B-6 of the communications schedule 135B and the respective ones of the plurality of cells 134A-1, 134A-2, 134A-3, 134A-4, 134A-5, 134A-6 of the communications schedule 135A.

In some implementations, the nodes (or devices) described herein may be equipped with one or more processors, components, transceivers, sensors or other systems for engaging in communications with other nodes (or devices), and with any other external computer devices via one or more other networks. For example, the nodes may each include any number of transceivers or other systems for communicating via any wired or wireless protocols, standards or specifications, including but not limited to Wireless Fidelity ("Wi-Fi"), near-field communication (or "NFC"), Bluetooth®, or any other type of protocols, standards or specifications.

In some implementations, each of the devices of a network, e.g., a PAN, may be configured to operate according to the 802.15.4 family of protocols, standards or specifications. Additionally, nodes (or devices) that are connected to networks may be homogenous or heterogeneous in nature, such that each of the nodes (or devices) of a network may have one or more attributes or features in common with any number of other nodes (or devices) of the network, or need not have any attributes or features in common with any number of the other nodes (or devices).

Time-slotted channel hopping, or TSCH, is a medium access control technique that relies on time synchronization to achieve low power operations and channel hopping for enhanced reliability. When a PAN operates based on TSCH, activities of each node in the PAN are controlled according to a time-slotted schedule in which time is carved into timeslots (or slot offsets) that are grouped into slotframes that repeat over time, and in which frequencies are divided into channels (or channel offsets). The schedule may be represented as a matrix or another set of cells, with each of the cells lying at an intersection of one timeslot and one channel.

Each of the timeslots is sufficiently long to accommodate a transmission of data and also a receipt of an acknowledgement, as well as encryption or decryption of the data, where necessary. The timeslots may have any duration or width. In some implementations, each of the timeslots may have a duration of approximately fifteen milliseconds (15 ms). Moreover, each of the timeslots is further identified with respect to a slot offset, e.g., an interval of time within a slotframe when the timeslot occurs, as well as a channel offset, e.g., an identification of a frequency for communication. A size of a slotframe is defined by a number of timeslots included therein. In some implementations, a slotframe may include approximately sixty to seventy timeslots. Timeslots may be dedicated to a single node or shared by two or more nodes. The channel hopping nature of a communications schedule in TSCH permits the same timeslot in a slotframe to be utilized for the transfer of data at a different frequency in each iteration of the slotframe.

The channels may be provided within any range of frequencies. In some implementations, the channels may be provided within a band centered around a frequency within a range of frequencies between approximately nine hundred megahertz and approximately nine hundred fifty megahertz (900-950 MHz), between approximately nine hundred two megahertz and approximately nine hundred twenty-eight megahertz (902-928 MHz), between approximately eight hundred fifty megahertz and approximately eight hundred seventy-five megahertz (850-875 MHz), or between approximately eight hundred sixty-three megahertz and approximately eight hundred seventy megahertz (863-870 MHz). In some other implementations, the channels may be provided within a band centered around a frequency of approximately 2.4 gigahertz (GHz).

A PAN is formed when a node, e.g., a coordinator, transmits a beacon (or a beacon frame) of information in a process known as advertising. The beacon may include any information regarding synchronization, channel hopping, or timeslots that are utilized by the PAN being advertised. Other nodes that intend to connect with the coordinator may actively or passively scan one or more of a predetermined set of channels over a period of time in order to determine whether any beacons are being transmitted by nodes (e.g., the coordinator, or synchronizers) within such channels. Upon receiving a beacon transmitted by a node of a PAN, the node may request to join the PAN by synchronizing with one or more nodes of the PAN, and operating in accordance with a communications schedule identified in the beacon. Once a node joins a PAN, the node may communicate with other nodes of the network through one or more scheduled slotframes, and becomes a synchronizer that continuously advertises the PAN to other nodes by transmitting beacons.

The nodes (or devices) of the present disclosure may be mounted on walls, ceilings, roofs or other surfaces or structures of any type or form of facility, e.g., in locations where such nodes may remain in an operational range or communications range of one or more other nodes, such as is shown in FIG. 1G. For example, one or more nodes may be provided in association with any working area or environment, building, region, structure or other space (e.g., covered or uncovered) where access to one or more networks may be desired, such as a business-related structure such as an office, a shopping center, a restaurant (e.g., a coffee shop), a materials handling facility, a post office, a grocery store, a department store, or any other defined or undefined structure having one or more commercial areas. Alternatively, one or more nodes may be provided in association with a home of any type, kind, shape or form (e.g., a house, an apartment, a condominium, a dormitory, or any other defined or undefined structure having one or more living spaces), as well as indoor or outdoor forums or facilities such as stadiums, ballfields, parks (or other open spaces), transportation centers or financial institutions (e.g., banks).

Furthermore, a node may be configured to connect with any number of networks (e.g., the Internet) by any wired or wireless connections, and in accordance with any protocols, standards or specifications. For example, in some implementations, a node may be configured to communicate by way of any Institute of Electrical and Electronics Engineers (or "IEEE") standards, including but not limited to any of the IEEE 802 family of protocols, standards or specifications, and more specifically any of the IEEE 802.15 protocols, standards or specifications, viz., the IEEE 802.15.4 protocol.

Nodes of any other type or form may synchronize with other nodes to form PANs in such working areas or environments. Such other nodes may include any type or form of device, such as any number of sensors, cameras, load sensors, acoustic sensors (e.g., microphones), or any other sensors, as well as general-purpose or special-purpose machines such as personal computing devices (e.g., desktop computers, laptop computers, mobile devices, smartphones, tablets or smart speakers, as well as appliances or systems such as televisions, set-top boxes, audio or video equipment, refrigerators, ovens, telephones, garage door openers, security systems, lights, switches, locks, or others.

Figure 2:
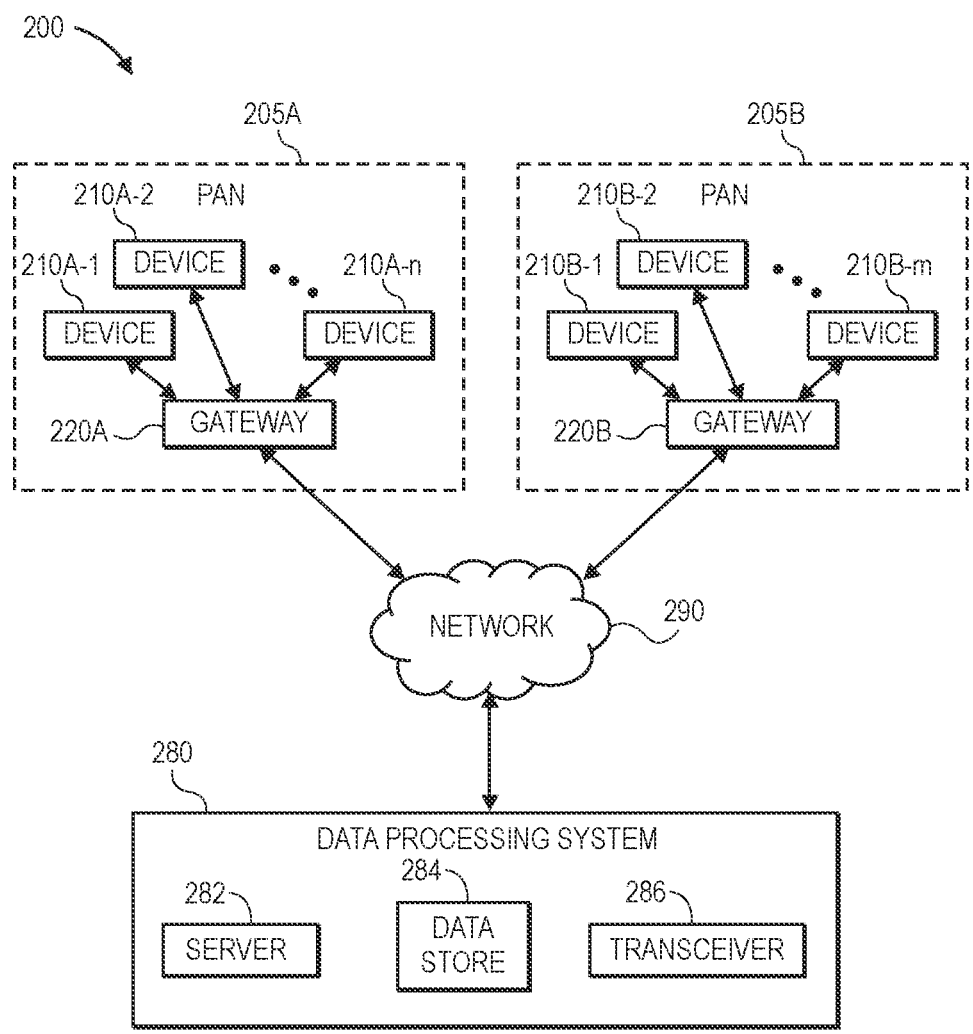
FIG. 2 is a block diagram of one system for network management in accordance with implementations of the present disclosure.

Referring to FIG. 2, block diagrams of one system 200 for network management in accordance with implementations of the present disclosure are shown. The system 200 includes a first personal access network (or PAN) 205A and a second PAN 205B, and an external network 290. The first PAN includes a plurality of devices 210A-1, 210A-2 . . . 210A-n and a gateway 220A. The second PAN includes a plurality of devices 210B-1, 210B-2 . . . 210B-m and a gateway 220B. Except where otherwise noted, reference numerals preceded by the number "2" in FIG. 2 refer to elements that are similar to elements having reference numerals preceded by the number "1" shown in FIGS. 1A through 1G.

The gateway 220A is configured to associate with any or all of the devices 210A-1, 210A-2 . . . 210A-n, and to enable such devices 210A-1, 210A-2 . . . 210A-n to communicate with one or more external computer devices or systems, e.g., the data processing system 280 or others (not shown), over the external network 290, which may include the Internet in whole or in part. Similarly, the gateway 220B is configured to associate with any or all of the devices 210B-1, 210B-2 . . . 210B-m, and to enable such devices 210B-1, 210B-2 . . . 210B-m to communicate with one or more external computer devices or systems, e.g., the data processing system 280 or others (not shown), over the external network 290.

In some embodiments, each of the gateways 220A, 220B may be a wireless router, a "hot spot," an antenna system, or any other device or component that is configured to enable communication over the external network 290. The gateways 220A, 220B may include one or more processors, one or more data stores (or memory components), one or more transceivers and one or more antenna modules or any other components. In some implementations, one or more of the components of the gateways 220A, 220B may be provided on a circuit board or card, e.g., a network interface card.

The processors of the gateways 220A, 220B may be configured to execute one or more sets of instructions, which may be stored in the one or more data stores or elsewhere, for causing either or both of the gateways 220A, 220B to perform any of the functions or operations described herein. In some implementations, the processors of the gateways 220A, 220B may generate communications schedules, or frequency plans, for communication with the PANs 205A, 205B, including cells that are scheduled or unscheduled and may be defined by channels (or channel offsets) and timeslots (or slot offsets). In some other implementations, the processors of the gateways 220A, 220B may generate beacons, e.g., enhanced beacons, that advertise the respective PANs 205A, 205B and include information regarding the communications schedules, as well as information regarding synchronization, channel hopping, or timeslots that are utilized by the respective PANs 205A, 205B. Alternatively, or additionally, any of the devices 210A-1, 210A-2 . . . 210A-n or the devices 210B-1, 210B-2 . . . 210B-m may likewise generate such beacons or other information.

Additionally, in some implementations, the processors may generate one or more frames of data corresponding to an authentication response or an association response, and cause such frames of data to be transmitted by the transceivers of the gateways 220A, 220B, as necessary. In some other implementations, however, the processors may interpret one or more frames of data, which may correspond to an authentication request, or an association request, as necessary.

The transceivers of the gateways 220A, 220B may be configured to enable the gateways 220A, 220B to receive or transmit information or data to or from the data processing system 280, or any other computing device, over the external network 290. For example, the transceivers of the gateways 220A, 220B may be configured to communicate through one or more wired or wireless means, e.g., wired technologies such as Universal Serial Bus (or "USB") or fiber optic cable, or standard wireless protocols, standards or specifications such as Bluetooth® or any Wi-Fi protocol, such as over the external network 290 or directly. The transceivers of the gateways 220A, 220B may also be configured to enable the gateways 220A, 220B to communicate with any of the devices 210A-1, 210A-2 . . . 210A-n or the devices 210B-1, 210B-2 . . . 210B-m, according to any wireless protocols, standards or specifications such as a Bluetooth® or Wi-Fi protocol. For example, the transceivers may be configured to communicate according to the 802.15.4 family of protocols, standards or specifications for communications over one or more networks (e.g., personal area networks). The transceivers may perform any necessary protocol, timing or other data transformations in order to convert data signals from a first format suitable for use by one component into a second format suitable for use by another component. In some implementations, the transceivers may include support for devices attached through various types of peripheral buses, e.g., variants of the Peripheral Component Interconnect (PCI) bus standard or the Universal Serial Bus (USB) standard. In some other implementations, functions of the transceivers may be split into two or more separate components, or incorporated directly into the processors. Additionally, the transceivers may be configured to operate or perform any type of encryption and on any basis.

The antenna modules of the gateways 220A, 220B may be one or more components for transmitting or receiving information or data to or from the devices 210A-1, 210A-2 . . . 210A-n or the devices 210B-1, 210B-2 . . . 210B-m, or to or from one or more other components or systems, e.g., over the external network 290 or directly. For example, the antenna modules may be configured to transmit one or more signals in any direction (e.g., a single direction or omnidirectional), or receive one or more signals from any direction, and at any frequency range or in accordance with any protocol, standard or specification.

Additionally, the gateways 220A, 220B may further include any type of power source for providing electrical power or other forms of power in support of one or more electrical loads. Such power sources may include, for example, one or more batteries or other power cells, e.g., dry cell or wet cell batteries such as lead-acid batteries, lithium ion batteries, nickel cadmium batteries or nickel metal hydride batteries, or any other type, size or form of batteries, and may each have any cell voltages, peak load currents, charge times, specific energies, internal resistances or cycle lives, or other power ratings. The gateways 220A, 220B may also include any type, size or form of other power source, e.g., other than a battery, including but not limited to one or more fuel cells or solar cells.

The devices 210A-1, 210A-2 . . . 210A-n or the devices 210B-1, 210B-2 . . . 210B-m may be any type or form of sensor (e.g., a camera, a load sensor, or another sensor), computing device (e.g., a smartphone, a tablet computer, a laptop computer, a desktop computer, or computing devices provided in wristwatches, televisions, set-top boxes, automobiles or any other appliances or machines), or any other machine. The processors of the devices 210A-1, 210A-2 . . . 210A-n or the devices 210B-1, 210B-2 . . . 210B-m may be configured to execute one or more sets of instructions, which may be stored in the one or more data stores of such devices or elsewhere, for causing such devices to perform any of the functions or operations described herein. For example, in some implementations, the processors may generate one or more frames of data corresponding to an authentication request or an association request, and cause such frames of data to be transmitted to one or more other devices, as necessary. In some other implementations, however, the processors may interpret one or more frames of data, which may correspond to an authentication response, or an association response, as necessary.

The processors of the devices 210A-1, 210A-2 . . . 210A-n or the devices 210B-1, 210B-2 . . . 210B-m may be configured to perform any type or form of computing function, including but not limited to the execution of one or more machine learning algorithms or techniques, for controlling any aspects of the operation of the devices 210A-1, 210A-2 . . . 210A-n or the devices 210B-1, 210B-2 . . . 210B-m and any computer-based components thereon, e.g., data stores, transceivers, input/output (or "I/O") devices or others. The processors may further control any aspects of the operation of any number of additional components that may be provided on the devices 210A-1, 210A-2 . . . 210A-n or the devices 210B-1, 210B-2 . . . 210B-m, e.g., one or more other sensors, illuminators (e.g., lights), or the like. In some embodiments, the processors may be configured to initiate a handshake with one or more of the gateways 220A, 220B e.g., by exchanging one or more packets of information or data with the gateways 220A, 220B. A successfully completed handshake may open up a communications channel between the gateway 220A and any of the devices 210A-1, 210A-2 . . . 210A-n or between the gateway 220B and any of the devices 210B-1, 210B-2 . . . 210B-m, e.g., in accordance with a communications schedule.

In some embodiments, the processors of the devices 210A-1, 210A-2 . . . 210A-n or the devices 210B-1, 210B-2 . . . 210B-m may be configured to determine that a handshake has been accepted or refused by one or more gateways, and to execute one or more actions in response to the acceptance or refusal, e.g., to transfer data according to one or more protocols or standards, such as Transmission Control Protocol (or "TCP"), Transport Layer Security (or "TLS"), Secure Sockets Layer ("or "SSL"), or the others.

The processors of the devices 210A-1, 210A-2 . . . 210A-n or the devices 210B-1, 210B-2 . . . 210B-m may include a uniprocessor system including one processor, or a multiprocessor system including several processors (e.g., two, four, eight, or another suitable number), and may be capable of executing instructions. For example, in some embodiments, such processors may be a general-purpose or embedded processor implementing any of a number of instruction set architectures (ISAs), such as the x86, PowerPC, SPARC, or MIPS ISAs, or any other suitable ISA. Where the processors are components of a multiprocessor system, each of the processors within the multiprocessor system may operate the same ISA, or different ISAs.

The data stores of the devices 210A-1, 210A-2 . . . 210A-n or the devices 210B-1, 210B-2 . . . 210B-m may be further configured to store any other data items accessible by or to processors thereof. The data stores may be implemented using any suitable technology, such as static random access memory (SRAM), synchronous dynamic RAM (SDRAM), nonvolatile/Flash-type memory, or any other type of memory. Information or data stored in the data stores may be generated by one or more of the devices 210A-1, 210A-2 . . . 210A-n or the devices 210B-1, 210B-2 . . . 210B-m, or the gateways 220A, 220B, or any systems in communication therewith, and transmitted by transmission media or signals, such as electrical, electromagnetic, or digital signals, which may be conveyed via a communication medium such as a wired and/or a wireless link.

The transceivers of the devices 210A-1, 210A-2 . . . 210A-n or the devices 210B-1, 210B-2 . . . 210B-m may be configured to transmit and/or receive Wi-Fi signals, Bluetooth® signals, NFC signals, or any other type or form of signals within any frequency spectra or having any intensity or center frequency. The transceivers may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceivers may be of any kind or type, and may be sent over the one or more networks 290 or directly to one or more of the gateways 220A, 220B or any other computer devices or components.

The devices 210A-1, 210A-2 . . . 210A-n or the devices 210B-1, 210B-2 . . . 210B-m may include one or more I/O devices, which may be configured to receive and provide information to human users of the devices 210A-1, 210A-2 . . . 210A-n or the devices 210B-1, 210B-2 . . . 210B-m and may include, but need not be limited to, a display, (e.g., a touch-screen display), a scanner, a keyboard, a keypad, a biometric scanner, an audio transducer, one or more speakers, one or more imaging devices such as a video camera, and any other types of input or output devices that may support interaction between the devices 210A-1, 210A-2 . . . 210A-n or the devices 210B-1, 210B-2 . . . 210B-m and a human operator. The devices 210A-1, 210A-2 . . . 210A-n or the devices 210B-1, 210B-2 . . . 210B-m may further include one or more displays or other types or forms of systems for electronically displaying information, including but not limited to an electronic ink display, a liquid crystal display (or "LCD"), a light-emitting diode (or "LED") display, or an organic light-emitting diode (or "OLED") display.

Moreover, in some implementations, the processors of the devices 210A-1, 210A-2 . . . 210A-n or the devices 210B-1, 210B-2 . . . 210B-m may also generate beacons, e.g., enhanced beacons, or other information regarding the operation of the PANs 205A, 205B, and the transceivers of the devices 210A-1, 210A-2 . . . 210A-n or the devices 210B-1, 210B-2 . . . 210B-m may transmit such beacons or other information to the gateways 220A, 220B or one or more other nodes or other devices.

The data processing system 280 includes one or more physical computer servers 282 having one or more computer processors and any number of data stores 284 (e.g., databases) associated therewith, as well as provided for any specific or general purpose. For example, the data processing system 280 of FIG. 2 may be independently provided for the exclusive purpose of receiving, analyzing or storing information or data received from any source or, alternatively, provided in connection with one or more physical or virtual services configured to receive, analyze or store such imaging data or other information or data, as well as one or more other functions. The servers 282 may be connected to or otherwise communicate with the data stores 284, which may store any type of information or data, including but not limited to acoustic signals, imaging data, or other information or data, for any purpose. The servers 282 may also connect to or otherwise communicate with the network 290 through the sending and receiving of digital data. For example, the data processing system 280 may include any facilities, stations or locations having the ability or capacity to receive and store information or data, such as media files, from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles.

The transceivers 286 may be configured to enable the data processing system 280 to receive or transmit information or data to or from any of the gateways 220A, 220B, or any other computing device, over the network 290. For example, the transceivers 286 may be configured to communicate through one or more wired or wireless means, e.g., wired technologies such as Universal Serial Bus (or "USB") or fiber optic cable, or standard wireless protocols, standards or specifications such as Bluetooth® or any Wi-Fi protocol, such as over the network 290 or directly. The transceivers 286 may also be configured to enable the data processing system 280 to communicate with any of the devices 210A-1, 210A-2 . . . 210A-n or the devices 210B-1, 210B-2 . . . 210B-m according to any wireless protocols, standards or specifications such as Bluetooth® or Wi-Fi protocol, by way of the gateways 220A, 220B.

For example, the transceivers 286 may be configured to communicate according to the 802.15.4 family of protocols, standards or specifications for wireless communications over one or more networks (e.g., personal area networks). The transceivers 286 may perform any necessary protocol, timing or other data transformations in order to convert data signals from a first format suitable for use by one component into a second format suitable for use by another component. For example, in some implementations, the transceivers 286 may include support for devices attached through various types of peripheral buses, e.g., variants of the Peripheral Component Interconnect (PCI) bus standard or the Universal Serial Bus (USB) standard. In some other implementations, functions of the transceivers 286 may be split into two or more separate components, or incorporated directly into the server 282. Additionally, the transceivers 286 may be configured to operate or perform any type of encryption and on any basis.

The network 290 may be any wired network, wireless network, or combination thereof, and may comprise the Internet in whole or in part. In addition, the network 290 may be or include one or more of a personal area network, local area network, wide area network, cable network, satellite network, cellular telephone network, or combinations or portions thereof. The network 290 may also be a publicly accessible network of one or more linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "materials handling facility," or like terms, may be automated steps performed by computer devices or resources, or implemented within software modules (or computer programs) executed by one or more general purpose computers. Those of ordinary skill in the pertinent arts would also recognize that process steps described as being performed by a "materials handling facility," or like terms, may be typically performed by a human, but could, alternatively, be performed by an automated agent. The protocols and components for providing communication between a materials handling facility and any of the gateways 220A, 220B, the devices 210A-1, 210A-2 . . . 210A-n or the devices 210B-1, 210B-2 . . . 210B-m are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors, the servers, the data stores, or the transceivers or the I/O devices of the devices 210A-1, 210A-2 . . . 210A-n or the devices 210B-1, 210B-2 . . . 210B-m, as well as the servers 282, the data stores 284 or the transceivers 286 of the data processing system 280, or any other computers or control systems having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the system 200 of FIG. 2 is shown as having two PANs 205A, 205B, each having a single gateway 220A, 220B and three devices 210A-1, 210A-2 . . . 210A-n and devices 210B-1, 210B-2 . . . 210B-m, respectively, those of ordinary skill in the pertinent arts will recognize that the systems and methods of the present disclosure are not so limited. Rather in some embodiments, a system may include, or a method may involve, any number of PANs, each having any number of nodes or devices associated therewith. For example, in some implementations, a materials handling facility may include hundreds or even thousands of devices, and any number of gateways in communication with such devices. Furthermore, the words "node" and "device" may be used interchangeably herein to refer to a component of a communications network, e.g., a redistribution point, or an endpoint, or any other component that is capable of generating, transmitting or receiving information or data over one or more channels and for one or more durations.

Figure 3A:
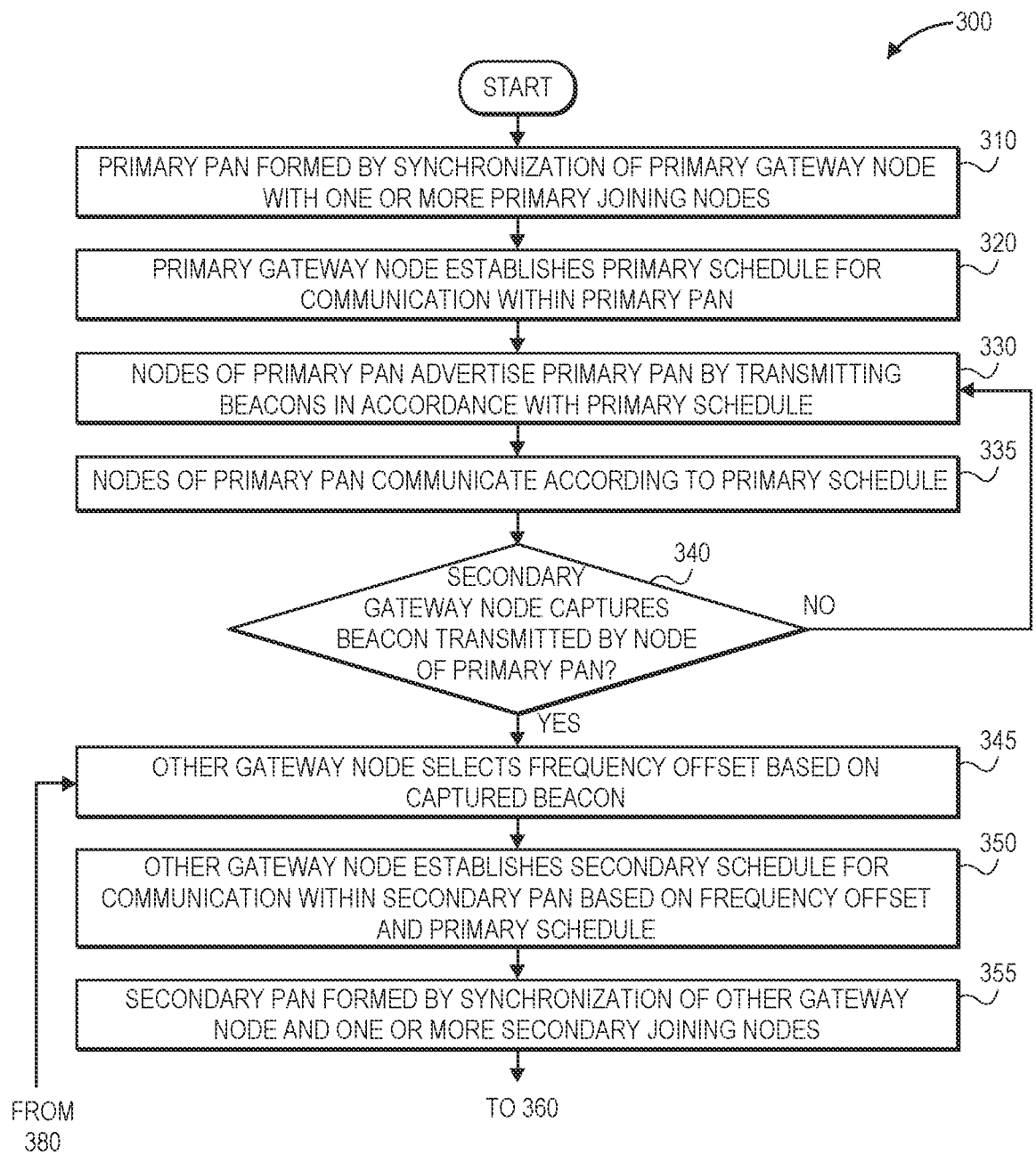
FIGS. 3A and 3B are a flow chart of one process for network management in accordance with implementations of the present disclosure.
Figure 3B:
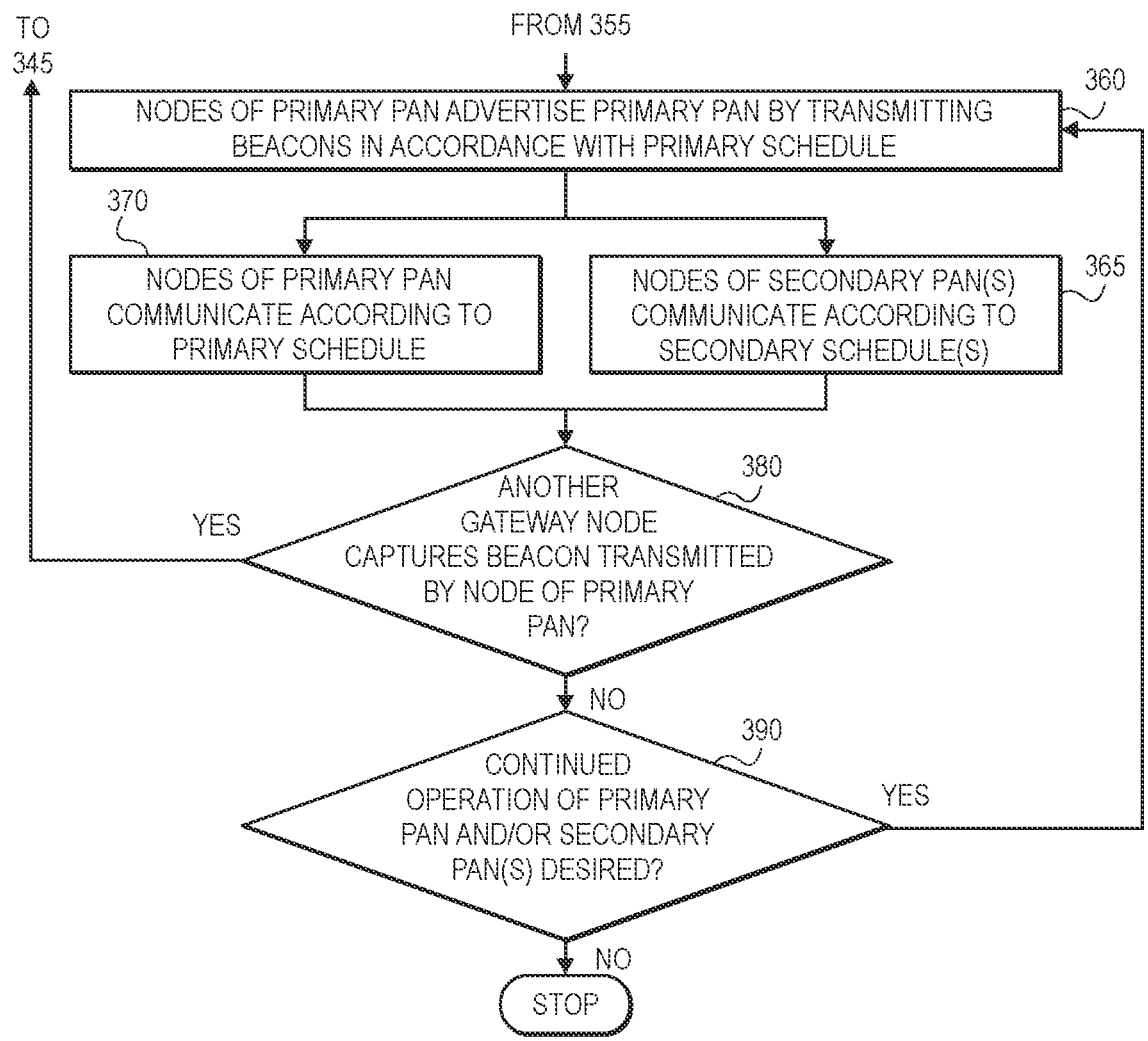

Referring to FIG. 3, a flow chart of one process for network management in accordance with implementations of the present disclosure is shown. At box 310, a primary PAN is formed by synchronization of a primary gateway node with one or more primary joining nodes. For example, in some implementations, the primary gateway node may act as a coordinator for the primary PAN, and may advertise its presence as such by transmitting one or more beacons containing information regarding synchronization, channel hopping, or timeslots that are utilized by the primary gateway node. Nodes scanning one or more channels may capture the beacon and request to synchronize with the primary gateway node, while also completing one or more authentication, authorization or security protocols. Alternatively, in some other implementations, a primary node that transmits beacons, and synchronizes with one or more other nodes, need not be a gateway (or an access point). Instead, the primary node that transmits the beacon may be any other type or form of device. Moreover, in some implementations, a beacon may be transmitted by any number of nodes within the primary PAN, e.g., one or more synchronizer nodes, and need not be transmitted by a coordinator of the primary PAN, viz., the primary gateway node.

The nodes of the primary PAN may be any type of device or machine, including but not limited to, cameras, load sensors or electronic shelf labels as well as cash registers, climate control devices (e.g., controllers such as thermostats or components such as heaters, air conditioners, humidifiers, fans or others), remote power switches, gate sensors, turnstiles, pedestals, security cameras, radiofrequency identification (or "RFID") transmitters or receivers, motion sensors, computer devices or systems (e.g., desktop computers, laptop computers, mobile devices, smartphones, tablets or smart speakers), proximity sensors, lighting components, or any other devices or systems that may be configured to communicate over one or more networks according to any protocol or standard.

At box 320, the primary gateway node establishes a primary schedule for communication within the primary PAN. For example, the primary schedule may be a channel hopping schedule, e.g., a time-slotted (or time-synchronized) channel hopping schedule, according to the IEEE 802.15.4 protocol, or any other protocol, standard or specification. In some implementations, the primary schedule may have a plurality of channels and a plurality of timeslots, and may be represented as a two-dimensional matrix with cells in rows corresponding to channels (or channel offsets), and columns corresponding to timeslots. Each of the cells of the primary schedule may represent a potential link between two nodes of the primary PAN. For example, some of the cells may be dedicated for transmissions by a single node of the PAN, e.g., a dedicated cell, and some of the cells may be open and available for transmissions by any number of nodes of the PAN, e.g., a shared cell.

At box 330, one or more nodes of the primary PAN advertise the primary PAN by transmitting beacons (e.g., enhanced beacons) in accordance with the primary schedule. For example, in some implementations, the beacon may be the same beacon that was transmitted upon the formation of the primary PAN. Alternatively, in some other implementations, the beacon may be updated to include any additional scheduling information. The beacons may be transmitted by any of the nodes of the primary PAN, including a coordinator (e.g., a gateway node) or a node other than the coordinator (e.g., a synchronizer).

At box 335, nodes of the primary PAN communicate according to the primary schedule. For example, in some implementations, the primary schedule may include any number of activities within any of the cells, e.g., transmitting, receiving, or "sleeping," and each of the cells may offer an allocation of bandwidth for such activities. Where a cell calls for a node to transmit data to another node, the transmitting node may verify an outgoing buffer to determine whether a packet is available for transmission, and transmit the packet to the other node. Where a cell calls for a node to receive data from another node, the cell monitors a given channel to receive a given packet, and acknowledges any packets with a reply message.

At box 340, whether another gateway node has captured a beacon transmitted by one of the nodes of the primary PAN is determined. For example, in some implementations, upon receiving the beacon from the one of the nodes of the primary PAN, another gateway node (or any other type of node or device) provided within an operational range or communications range of one or more nodes of the primary PAN may detect and recognize the scheduling information included within the beacon.

If another gateway node has not captured a beacon transmitted by any of the nodes of the primary PAN, then the process returns to box 330, where the nodes of the primary PAN continue to advertise the primary PAN by transmitting beacons in accordance with the primary schedule, and to box 335, where the nodes of the primary PAN continue to communicate according to the primary schedule, and to box 340, where whether another gateway node has captured a beacon transmitted by one of the nodes of the primary PAN is determined.

If another gateway node has captured a beacon transmitted by one or more of the nodes of the primary PAN, however, then the process advances to box 345, where the other gateway node selects a frequency offset based on the captured beacon. For example, in some implementations, the other gateway node may scan one or more channels of a plurality of timeslots and determine which of such channels is not presently used for communication within the primary PAN during any of the timeslots. Upon identifying one or more of such channels, the other gateway node may determine or calculate a frequency offset with respect to a channel that is utilized by nodes of the primary PAN, or any other PANs, during a given timeslot, e.g., as an integer or number of channels from the channel that is currently being utilized.

At box 350, the other gateway node establishes a secondary schedule for communication within a secondary PAN based on the frequency offset and the primary schedule. For example, in some implementations, the secondary schedule is a channel hopping sequence based on a channel hopping sequence of the primary schedule, with cells of the secondary schedule designating links or potential links that are provided at the frequency offset with respect to links of the primary schedule, but synchronized in time domain.

At box 355, a secondary PAN is formed by the synchronization of the other gateway node with one or more secondary joining nodes. For example, in some implementations, the secondary PAN may be formed in the same manner as the primary PAN described above with respect to box 310. Alternatively, in some other implementations, the secondary PAN may be formed in any other manner.

At box 360, one or more nodes of the primary PAN advertise the primary PAN by transmitting beacons in accordance with the primary schedule. For example, in some implementations, the beacon may be updated to include any additional scheduling information regarding the primary PAN and any secondary PANs. The beacons may be transmitted by any of the nodes of the primary PAN, including the coordinator or nodes other than the coordinator.

At box 370, the nodes of the primary PAN communicate according to the primary schedule. In parallel, at box 375, the nodes of the secondary PAN communicate according to the secondary schedule.

At box 380, whether another gateway node has captured the beacon transmitted by one of the nodes of the primary PAN is determined. If another gateway node has captured a beacon transmitted by any of the nodes of the primary PAN, then the process returns to box 345, where the other gateway node selects a frequency offset based on the captured beacon. In the event that another gateway node captures a beacon from the primary gateway node or any of the primary joining nodes, that gateway node may select a frequency offset based on the captured beacon, establish another secondary PAN with one or more secondary joining nodes, and enable communication by or between any number of the secondary joining nodes. For example, if any channels within a given timeslot of the primary schedule are open (e.g., if a cell corresponding to one of the channels is unscheduled in the primary schedule or any secondary schedules), then a frequency offset may be determined with respect to a channel that is utilized by nodes of the primary PAN, or any other PANs, e.g., as an integer or number of channels from the channel that is currently being utilized.

If no other gateway node has captured the beacon, however, then the process advances to box 390, where whether continued operation of the primary PAN and any secondary PANs is desired may be determined. If the continued operation of the primary PAN and any secondary PANs is desired, then the process returns to box 360, where the one or more nodes of the primary PAN advertise the primary PAN by transmitting beacons in accordance with the primary schedule. If the continued operation of the primary PAN and any secondary PANs is no longer desired, however, then the process ends.

Referring to FIGS. 4A through 4D, views of aspects of one system for network management in accordance with implementations of the present disclosure are shown. Except where otherwise noted, reference numerals preceded by the number "4" in FIGS. 4A through 4D refer to elements that are similar to elements having reference numerals preceded by the number "2" in FIG. 2 and by the number "1" shown in FIGS. 1A through 1G.

Figure 4A:
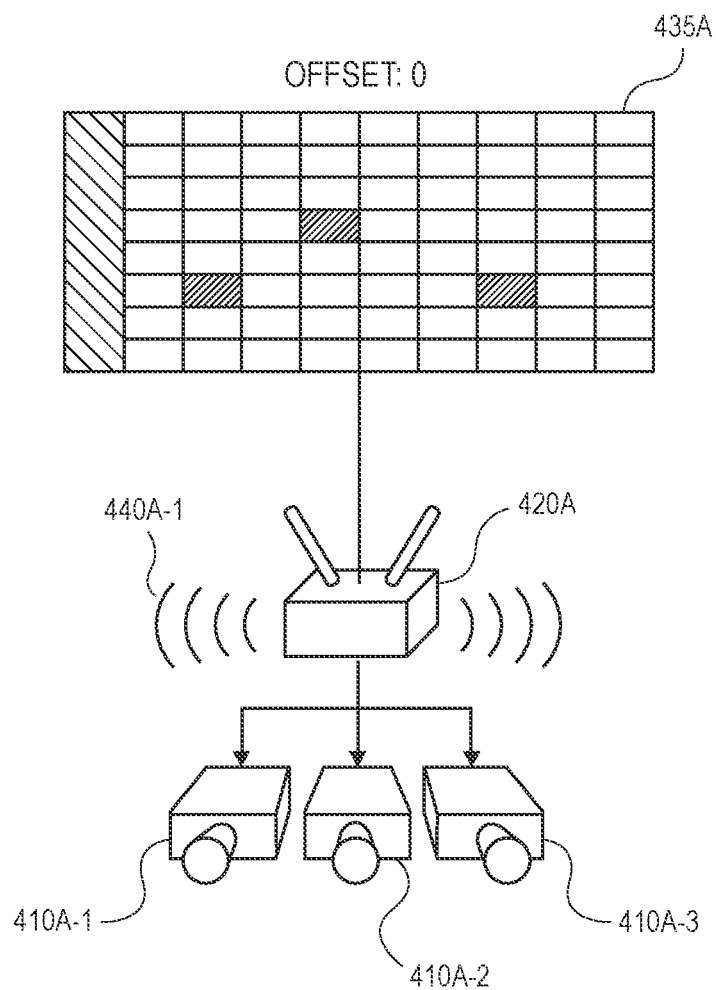
FIGS. 4A through 4D are views of aspects of one system for network management in accordance with implementations of the present disclosure.

As is shown in FIG. 4A, a primary PAN 405A includes a plurality of cameras 410A-1, 410A-2, 410A-3 and a gateway node 420A. The primary PAN 405A is configured to operate according to a primary communications schedule 435A, e.g., which may be defined by random channel hopping at a zero offset. The primary communications schedule 435A includes a plurality of cells, at least some of which are dedicated to communication between pairs of devices of the primary PAN 405A including one of the cameras 410A-1, 410A-2, 410A-3 and the gateway node 420A, arranged in a matrix of channels (or channel offsets) and timeslots (or slot offsets). Additionally, as is also shown in FIG. 4A, the gateway node 420A transmits a beacon 440A-1 (e.g., an enhanced beacon) including information regarding synchronization, channel hopping, or timeslots that are utilized by devices of the primary PAN 405A, such as the gateway node 420A and one or more of the cameras 410A-1, 410A-2, 410A-3, in accordance with the primary communications schedule 435A. Alternatively, in some implementations, each of the cameras 410A-1, 410A-2, 410A-3 may also transmit beacons in accordance with the primary communications schedule 435A. Moreover, in some implementations, the primary PAN 405A may include any number of other nodes or devices, and need not be limited to gateways (e.g., access points) or cameras.

Figure 4B:
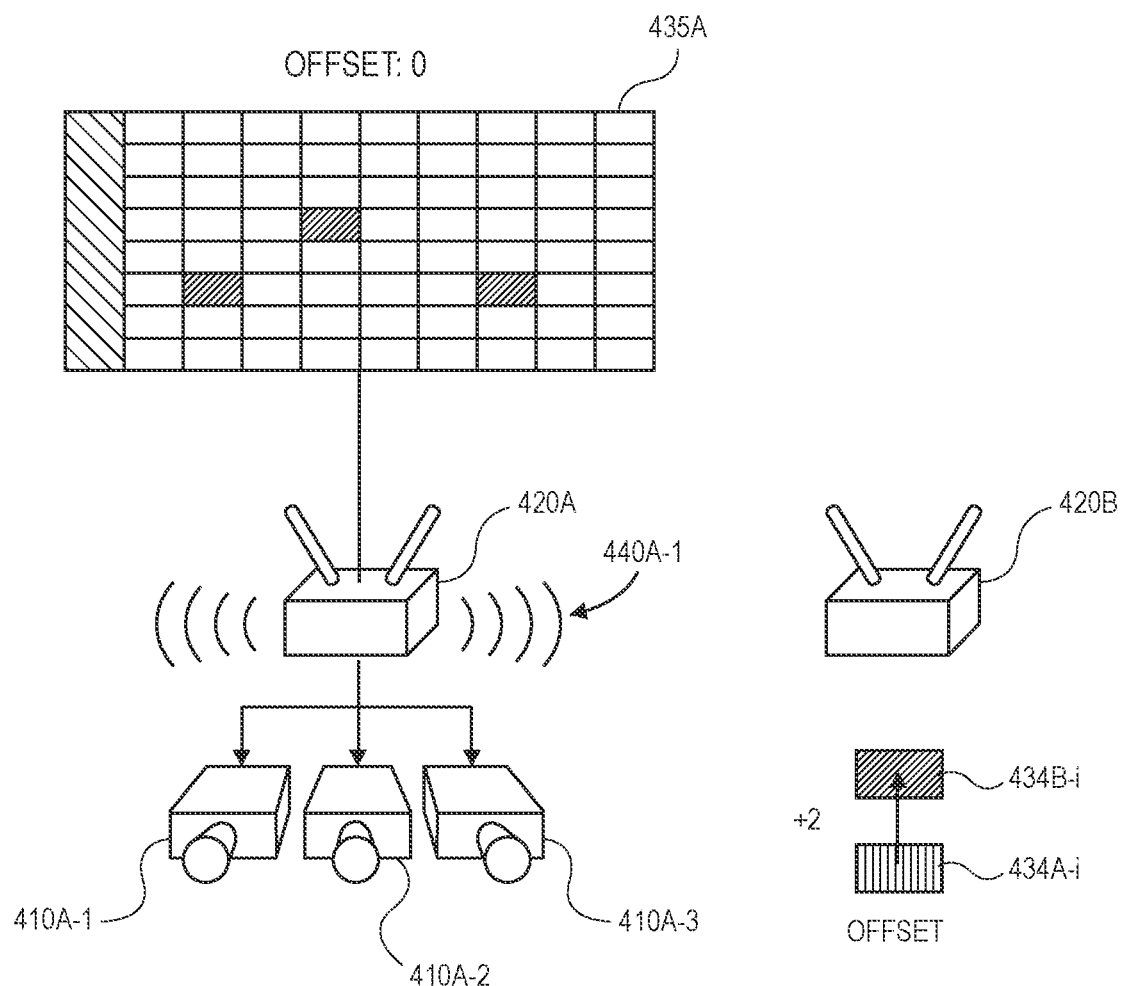

As is shown in FIG. 4B, when a gateway node 420B is installed within a vicinity of the primary PAN 405A, e.g., within an operational range or communications range of the gateway node 420A or one or more of the cameras 410A-1, 410A-2, 410A-3, the gateway node 420B scans one or more channels and receives the beacon 440A-1 from the gateway node 420A. Based on contents of the beacon 440A-1, the gateway node 420B determines an offset, viz., a two-cell offset, from cells 434A-i of the primary communications schedule 435A to cells 434B-i of a communications schedule for a PAN for which the gateway node 420B may act as a coordinator.

Figure 4C:
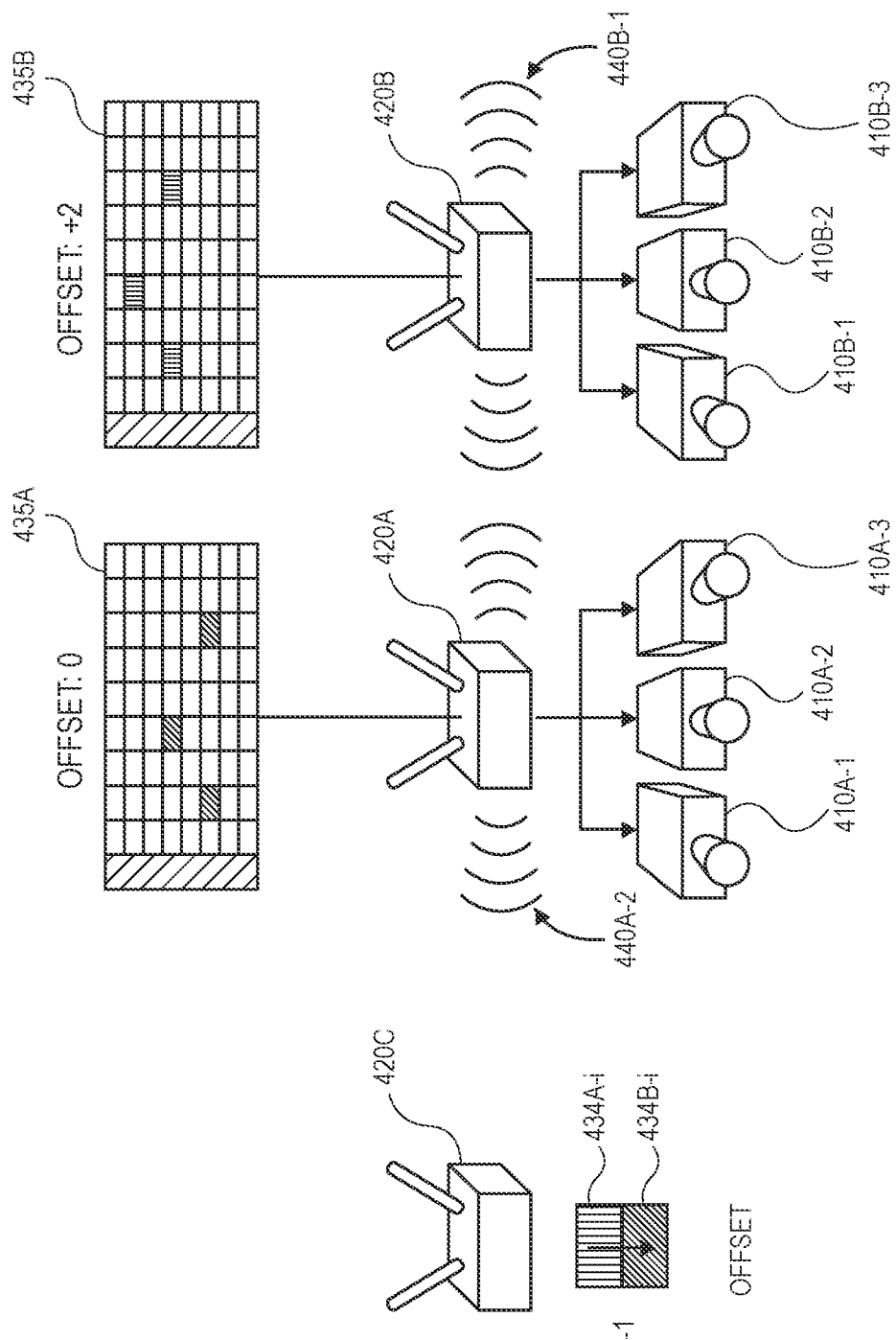

As is shown in FIG. 4C, the gateway node 420B forms a secondary PAN 405B with a plurality of cameras 410B-1, 410B-2, 410B-3. The secondary PAN 405B is configured to operate according to a secondary communications schedule 435B as determined based on the beacon 440A-1, e.g., subject to the random channel hopping that defined the primary communications schedule 435A, at a two-cell offset. The secondary communications schedule 435B includes the plurality of cells of the primary communications schedule 435A, at least some of which are dedicated to communication between pairs of devices of the secondary PAN 405B including one of the cameras 410B-1, 410B-2, 410B-3 and the gateway node 420B, arranged in the matrix of channels and timeslots of the primary communications schedule 435A. Once the secondary PAN 405B is established, the gateway node 420B transmits a beacon 440B-1 (e.g., an enhanced beacon) including information regarding synchronization, channel hopping, or timeslots that are utilized by devices of the secondary PAN 405B, such as the gateway node 420B and one or more of the cameras 410B-1, 410B-2, 410B-3, in accordance with the secondary communications schedule 435B. Additionally, as is also shown in FIG. 4C, the gateway node 420A transmits a beacon 440A-2 in accordance with the primary communications schedule 435A. The beacon 440A-2 may include the same information as the beacon 440A-1 shown in FIG. 4B, or additional or different information, including but not limited to information identifying the gateway node 420B or the secondary PAN 405B. Alternatively, in some implementations, each of the cameras 410B-1, 410B-2, 410B-3 may also transmit beacons in accordance with the secondary communications schedule 435B. Moreover, in some implementations, the secondary PAN 405B may include any number of other nodes or devices, and need not be limited to gateways (e.g., access points) or cameras.

As is further shown in FIG. 4C, when a gateway node 420C is installed within a vicinity of the primary PAN 405A or the secondary PAN 405B, e.g., within operational ranges or communications ranges of the gateway node 420A or the gateway node 420B, or one or more of the cameras 410A-1, 410A-2, 410A-3, 410B-1, 410B-2, 410B-3, the gateway node 420C scans one or more channels and receives one or more of the beacon 440A-2 from the gateway node 420A or the beacon 440B-1 from the gateway node 420B. Based on contents of the beacon 440A-2 or the beacon 440B-1, the gateway node 420C determines an offset, viz., a one-cell offset in an opposite direction from the two-cell offset of the secondary communications schedule 435B, from cells 434A-i of the primary communications schedule 435A to cells 434B-i of a communications schedule for a PAN for which the gateway node 420C may act as a coordinator.

Figure 4D:
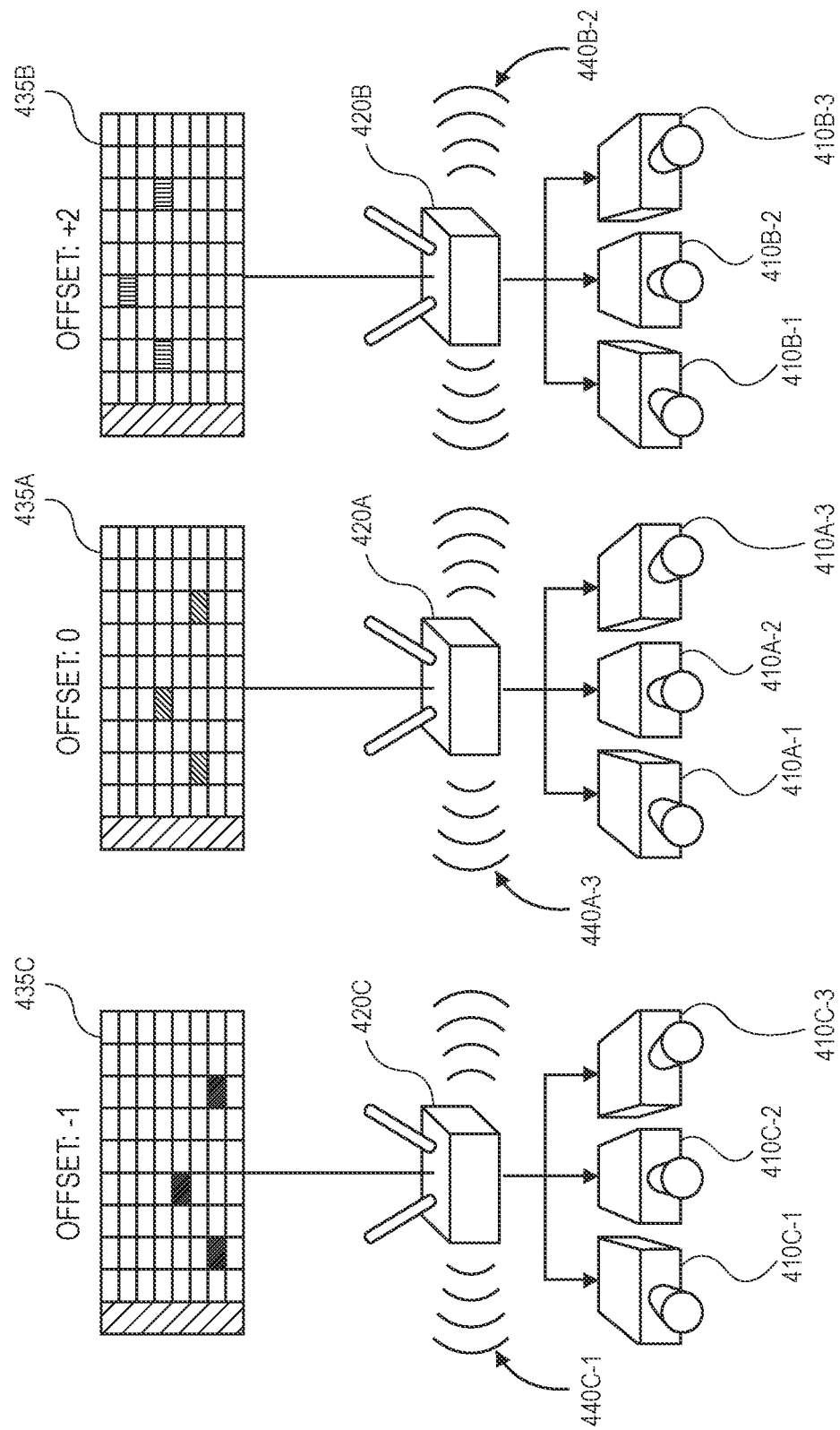

As is shown in FIG. 4D, the gateway node 420C forms another secondary PAN 405C with a plurality of cameras 410C-1, 410C-2, 410C-3. The secondary PAN 405C is configured to operate according to a secondary communications schedule 435C, as determined based on the beacon 440A-2 or the beacon 440B-1, e.g., subject to the random channel hopping that defined the primary communications schedule 435A, at a one-cell offset. The secondary communications schedule 435C includes the plurality of cells of the primary communications schedule 435A and the secondary communications schedule 435B, at least some of which are dedicated to communication between pairs of devices of the secondary PAN 405C including one of the cameras 410C-1, 410C-2, 410C-3 and the gateway node 420C, arranged in the matrix of channels and timeslots of the primary communications schedule 435A and the secondary communications channel 435B. Once the secondary PAN 405C is established, the gateway node 420C transmits a beacon 440C-1 (e.g., an enhanced beacon) including information regarding synchronization, channel hopping, or timeslots that are utilized by the devices of the secondary PAN 405C, such as the gateway node 420C and one or more of the devices 410C-1, 410C-2, 410C-3, in accordance with the secondary communications schedule 435C. Additionally, as is also shown in FIG. 4D, the gateway node 420A transmits a beacon 440A-3 in accordance with the primary communications schedule 435A, and the gateway node 420B transmits a beacon 440B-2 in accordance with the secondary communications schedule 435B. The beacon 440A-3 and the beacon 440B-2 may include the same information as the beacon 440A-2 or the beacon 440B-1, respectively, or additional or different information, including but not limited to information identifying the gateway node 420C or the secondary PAN 405C. Alternatively, in some implementations, each of the cameras 410C-1, 410C-2, 410C-3 may also transmit beacons in accordance with the secondary communications schedule 435C. Moreover, in some implementations, the secondary PAN 405C may include any type of nodes or devices, and need not be limited to gateways (e.g., access points) or cameras.

Although each of the primary PAN 405A and the secondary PANs 405B, 405C is shown as each including three cameras, a network may include any number of devices, of any type or form, in accordance with implementations of the present disclosure. For example, the primary PAN 405A or the secondary PANs 405B, 405C may include any other sensors or other nodes (or devices). Moreover, any number of networks may operate with communications schedules at offsets from the primary communications schedule 435A or the secondary communications schedules 435B, 435C.

Nodes or devices of a network may be programmed to communicate in various different communications modes (or transmission modes) within the confines of a communications schedule. Changes in the communications modes of any of the nodes or devices may be initiated by a coordinator, either in accordance with a schedule, at the coordinator's instruction based on conditions of the nodes or devices, or in response to a request from one or more of the nodes or devices. Referring to FIGS. 5A through 5D, views of aspects of one system for network management in accordance with implementations of the present disclosure are shown. Except where otherwise noted, reference numerals preceded by the number "5" in FIGS. 5A through 5D refer to elements that are similar to elements having reference numerals preceded by the number "4" in FIGS. 4A through 4D, by the number "2" in FIG. 2 and by the number "1" shown in FIGS. 1A through 1G.

Figure 5A:
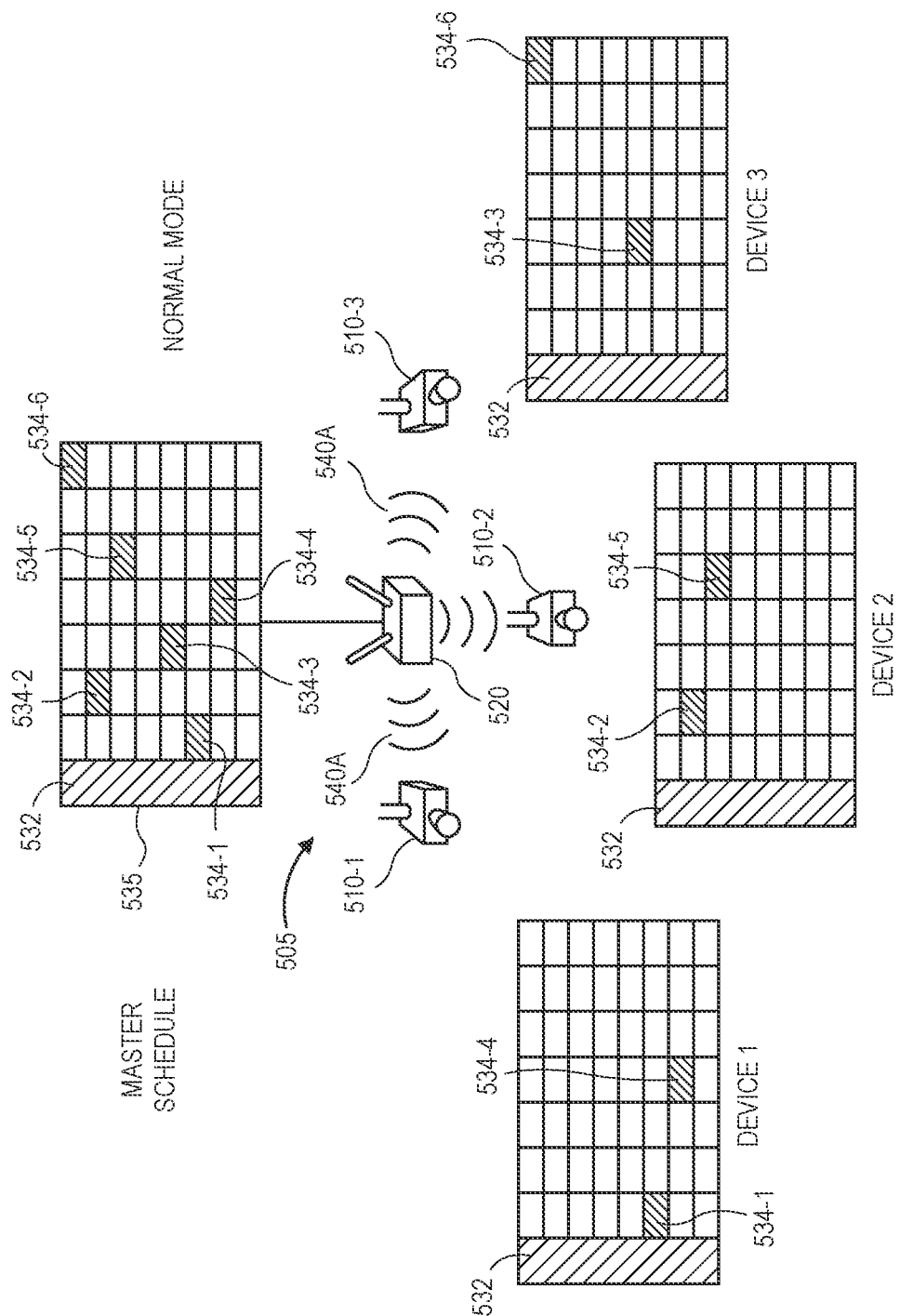
FIGS. 5A through 5D is a view of aspects of one system for network management in accordance with implementations of the present disclosure.

As is shown in FIG. 5A, a network 505 (e.g., a PAN) includes a gateway 520 and a plurality of devices 510-1, 510-2, 510-3. The network 505 is configured to operate according to a communications schedule 535 including a plurality of cells, at least some of which are dedicated to communication between pairs of devices of the network 505, arranged in a matrix of channels (or channel offsets) and timeslots (or slot offsets). Each of the cells of the communications schedule 535 may represent a potential link between two devices of the network 590. Some of the cells may be dedicated for transmissions by a single device of the network 590 to another device of the network 590, e.g., a dedicated link, and some of the cells may be open and available for transmissions by any number of devices of the network 590, e.g., a shared link.

In some implementations, the network 505 may exist independently of any other networks (e.g., PANs). In some other implementations, however, the network 505 may be a primary network having one or more nodes (e.g., the gateway 520) acting as a coordinator, and other nodes joined thereto. In some other implementations, the network 505 may be a secondary network having one or more nodes (e.g., the gateway 520) acting as a coordinator, and the communications schedule 535 may be selected based on a beacon received from a coordinator of another network, such as a primary network.

As is shown in FIG. 5A, the communications schedule 535 includes a shared cell 532 within which communication is enabled between the gateway 520 and any of the devices 510-1, 510-2, 510-3, e.g., in a common (e.g., shared) timeslot. Additionally, a plurality of dedicated cells 534-1, 534-2, 534-3, 534-4, 534-5, 534-6 correspond to links between the device 520 and other devices, viz., the devices 510-1, 510-2, 510-3, in various other channels and timeslots. The channels or the timeslots of the shared cell 532 or the dedicated cells 534-1, 534-2, 534-3, 534-4, 534-5, 534-6 may be selected in any manner, e.g., randomly or pseudo-randomly, in a hopping sequence. The communications schedule 535 also shows various cells that are unscheduled. The channels of the communications schedule 535 may represent communications within any frequency band and the timeslots of the communications schedule 535 may have any duration or width.

As is shown in FIG. 5A, the gateway 520 transmits a beacon 540A (e.g., an enhanced beacon) including information regarding the communications schedule 535 to the devices 510-1, 510-2, 510-3 in accordance with the primary communications schedule 535. Based on the beacon 540A, the devices 510-1, 510-2, 510-3 are programmed with information regarding dedicated cells within which the devices may transmit and/or receive information or data to or from the gateway 520, or to any other devices of the network 505.

The gateway 520 may select information or data to be transmitted within the confines of the communications schedule 535 at its own election, e.g., based on quality-of-service requirements or traffic requirements of the network 505 or any of the devices 510-1, 510-2, 510-3 or the gateway 520. Changes in the communication modes of a single one of the devices 510-1, 510-2, 510-3, or for each of the devices 510-1, 510-2, 510-3, may be triggered or initiated by the gateway 520 (or another coordinator of the PAN 505) or any of the respective devices 510-1, 510-2, 510-3 within the PAN 505, e.g., by signaling a communications mode change in MAC header, by transmitting a beacon or a command message.

Changes in the communications modes of one or more of the devices 510-1, 510-2, 510-3 or the gateway 520 may be triggered or initiated on any basis, such as upon determining that one or more of a quality-of-service requirement, a traffic requirement, or any other requirements are not being met in a current communications mode, upon anticipating that one or more of such requirements will not be met in the current communications mode, in accordance with a predetermined schedule, or on any other basis. For example, a coordinator node, or any other node, may determine that a communications mode is inadequate or excessive for an anticipated level of traffic, that a communications mode would consume an inappropriate or undesirable amount of processing capacity or power of one or more of the nodes of a network, or that the amount of processing capacity or power consumed by one or more modes of the network in a given communications mode is unnecessarily high, and may trigger or initiate a change in a communications mode for one or more nodes of a network accordingly.

In some implementations, only one communication mode may be active at any time on the plurality of devices 510-1, 510-2, 510-3. Moreover, although each of the devices 510-1, 510-2, 510-3 is shown as a camera or another imaging device, the PAN 505 may include any number of other devices, or any type or form, and the same communication mode, or different communication modes, may be selected for each of the devices 510-1, 510-2, 510-3, to allow larger numbers of devices to join the PAN 505, thereby increasing a level of utilization of the timeslots by the gateway 520, and to maximize the throughput capacity of the gateway 520, while also improving timeslot utilization and reducing power consumption.

As is shown in FIG. 5A, in a normal mode, each of the devices 510-1, 510-2, 510-3, may communicate with the gateway 520 in channels and timeslots corresponding to two of the dedicated cells of the communications schedule 535, such that availability for communication via the network 505 is evenly distributed among the devices 510-1, 510-2, 510-3. For example, the device 510-1 is configured to communicate with the gateway 520 within dedicated cells 534-1, 534-4, e.g., by transmitting information or data to or receiving information or data from the gateway 520, while the device 510-2 is configured to communicate with the gateway 520 within dedicated cells 534-2, 534-5, e.g., by transmitting information or data to or receiving information or data from the gateway 520, and the device 510-3 is configured to communicate with the gateway 520 within dedicated cells 534-3, 534-6, e.g., by transmitting information or data to or receiving information or data from the gateway 520. Alternatively, or additionally, any of the devices 510-1, 510-2, 510-3 or the gateway 520 may communicate with one another, e.g., by the transfer of information or data, within channels and the timeslot of the shared cell 532.

Figure 5B:
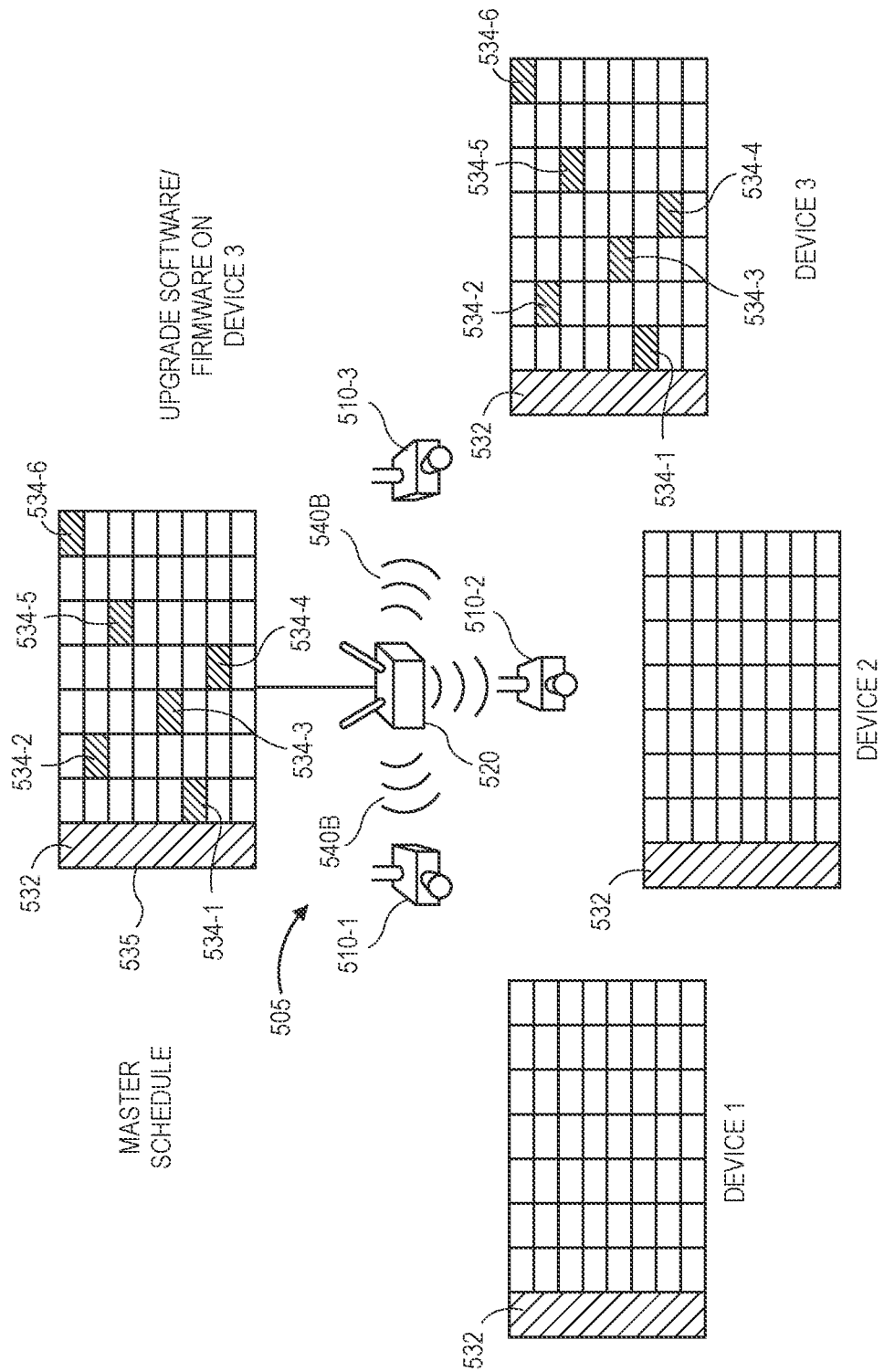

As is shown in FIG. 5B, where one of the devices, viz., the device 510-3, requires an upgrade to software or firmware, the gateway 520 may vary the communications modes of one or more of the devices 510-1, 510-2, 510-3 accordingly. For example, the gateway 520 may transmit a beacon 540B (or command message) to each of the plurality of devices 510-1, 510-2, 510-2 within the PAN 505. The beacon 540B instructs each of the devices 510-1, 510-2, 510-3 of the network 505 to operate in an upgrade mode, which may allocate each of the dedicated cells 534-1, 534-2, 534-3, 534-4, 534-5, 534-6 to the device 510-3. With the devices 510-1, 510-2, 510-3 operating in the upgrade mode shown in FIG. 5B, the device 510-1 or the device 510-3 may communicate with the gateway 520 or with one another within the channels and the timeslot of the shared cell 532, e.g., until the upgrade of the software or firmware of the camera 510-3 is complete.

Figure 5C:
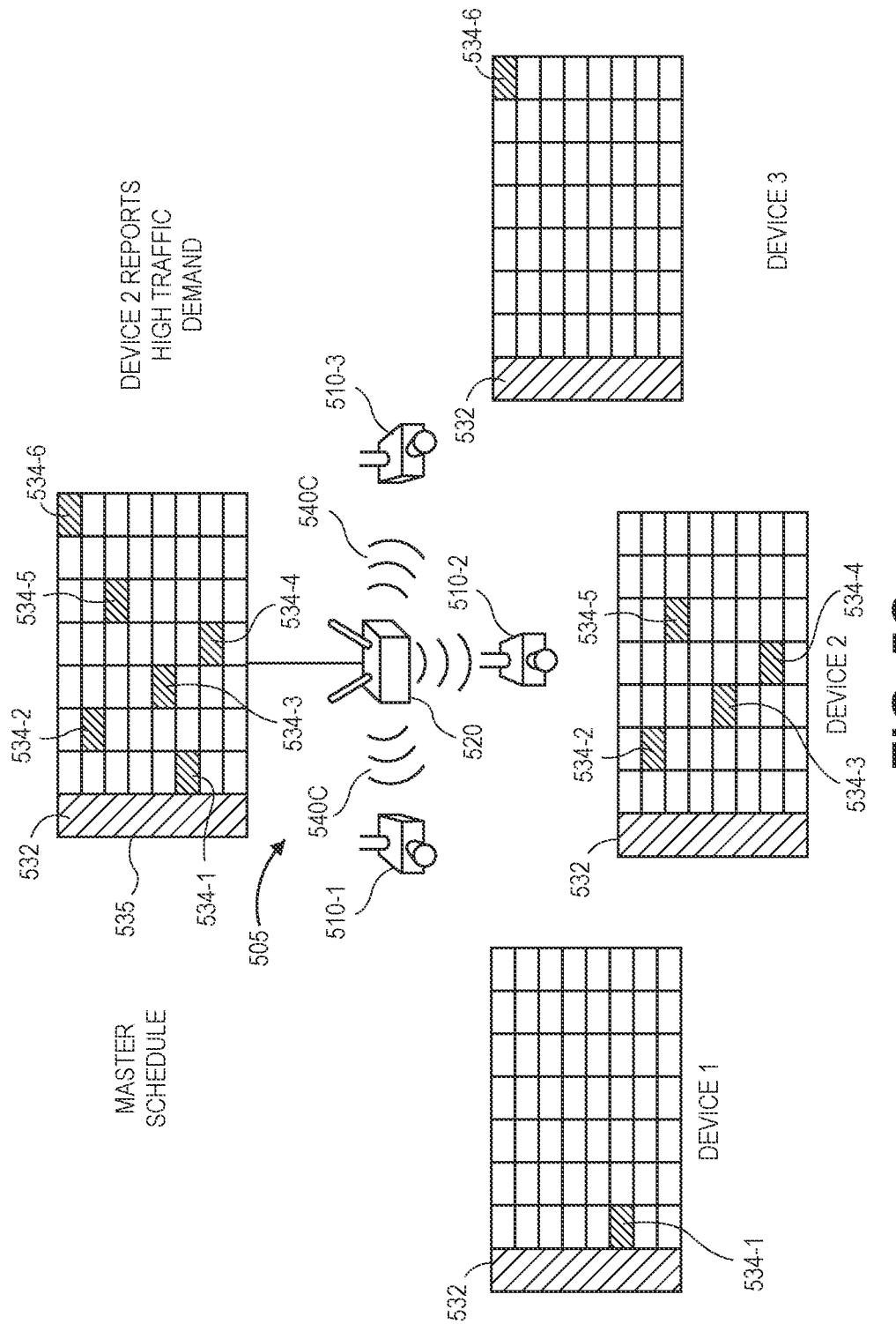

As is shown in FIG. 5C, where one of the devices, viz., the device 510-2, experiences a high demand for traffic with the gateway 520, the gateway 520 may vary the communications modes of one or more of the devices 510-1, 510-2, 510-3 accordingly. For example, the gateway 520 may transmit a beacon 540C (or command message) to each of the plurality of devices 510-1, 510-2, 510-3 within the PAN 505. The beacon 540C instructs each of the devices 510-1, 510-2, 510-3 of the network 505 to operate in a modified mode, which allocates the dedicated cell 534-4 and the dedicated cell 534-3 from the device 510-1 and the device 510-3, respectively, to the device 510-2. With the devices 510-1, 510-2, 510-3 operating in the upgrade mode shown in FIG. 5C, the device 510-1 or the device 510-3 may communicate with the gateway 520 or with one another within the channels and the timeslot of the dedicated cell 534-1 or the dedicated cell 534-6, respectively, or the shared cell 532, until the high demand for traffic between the device 510-2 and the gateway 520 is resolved or terminated.

Figure 5D:
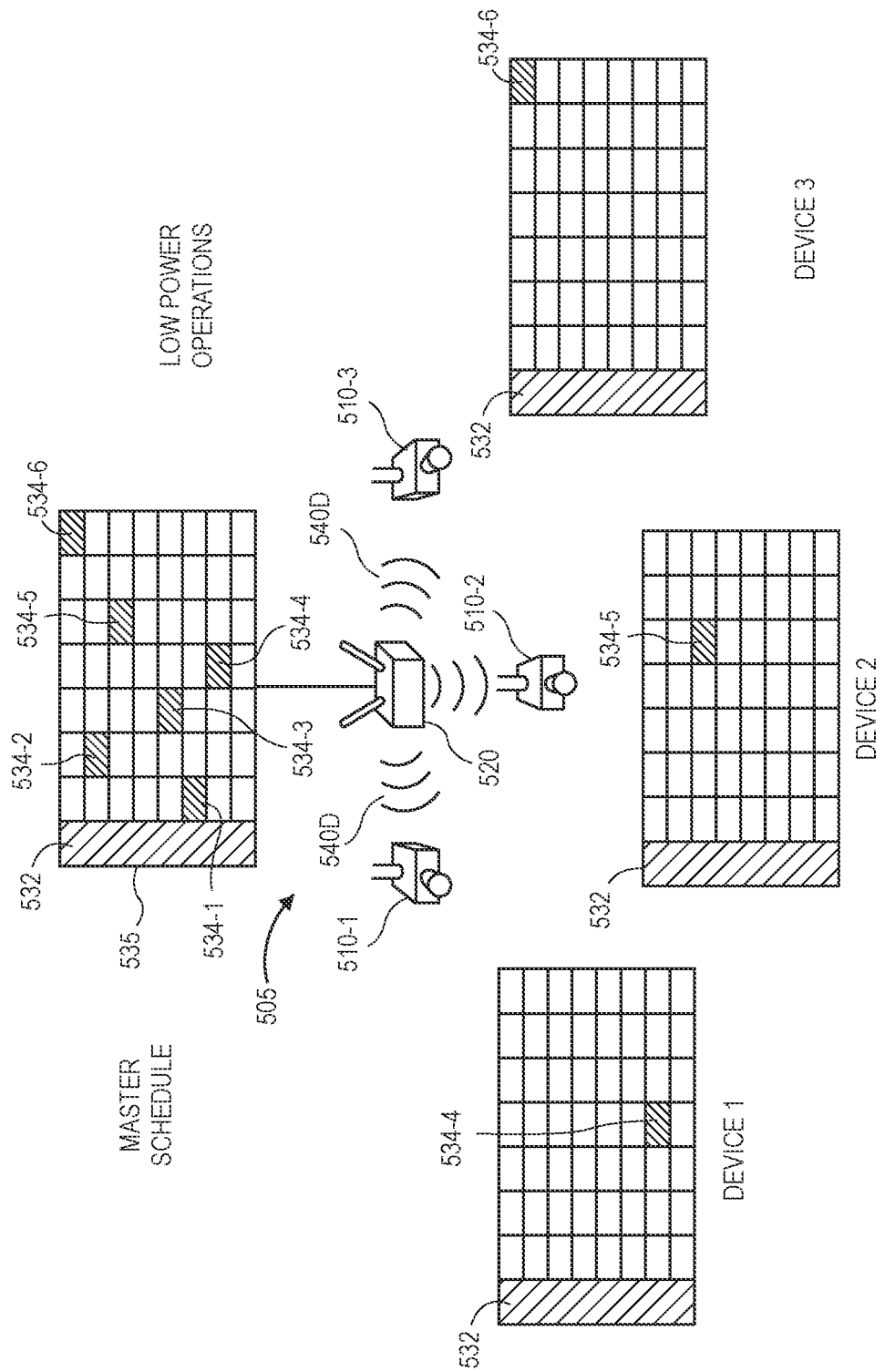

As is shown in FIG. 5D, during periods of reduced or low power operations, the gateway 520 may vary the communications modes of one or more of the devices 510-1, 510-2, 510-3 accordingly. For example, the gateway 520 may transmit a beacon 540D (or command message) to each of the plurality of devices 510-1, 510-2, 510-3 within the PAN 505. The beacon 540D instructs each of the devices 510-1, 510-2, 510-3 of the network 505 to operate in a low power mode (or a "power save" mode or "sleep" mode), which may include uplink or downlink timeslots at large intervals, e.g., one uplink timeslot and one downlink timeslot every thirty seconds, or any other interval, thereby limiting the dedicated cells within which the devices 510-1, 510-2, 510-3 may communicate with the gateway 520 accordingly. For example, as is shown in FIG. 5D, communications between the devices 510-1, 510-2, 510-3 and the gateway 520 are limited to the dedicated cells 534-4, 534-5, 534-6, or the shared cell 532, with the devices 510-1, 510-2, 510-3 operating in the low power mode shown in FIG. 5D.

Although some implementations of the present disclosure show the use of personal area networks to provide network access in various commercial settings, those of ordinary skill in the pertinent arts will realize that the systems and methods of the present disclosure are not so limited. Rather, the systems and methods of the present disclosure may be utilized in connection with any facility where access to networks is desired.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3A and 3B, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:
    establishing, by a first node of a first personal area network (PAN), a first channel hopping schedule for the first PAN, wherein the first channel hopping schedule comprises a plurality of channels and a plurality of timeslots;
    enabling communications between the first node of the first PAN and at least a second node of the first PAN in a first timeslot of the plurality of timeslots and a first channel of the plurality of channels, wherein enabling the communications between the first node of the first PAN and at least the second node of the first PAN comprises:
transmitting, by at least the first node of the first PAN, a beacon comprising information regarding the first channel hopping schedule, wherein the beacon is transmitted during at least a second timeslot of the plurality of timeslots;
receiving, by a first node of a second PAN, the beacon transmitted by at least the first node of the first PAN during the second timeslot of the plurality of timeslots;
determining, by the first node of the second PAN, a first offset based at least in part on the information regarding the first channel hopping schedule;
establishing, by the first node of the second PAN, a second channel hopping schedule for the second PAN based at least in part on the first channel hopping schedule and the first offset, wherein the second channel hopping schedule comprises the plurality of channels and the plurality of timeslots; and
enabling communications between the first node of the second PAN and at least a second node of the second PAN in the first timeslot of the plurality of timeslots and in a second channel of the plurality of channels, wherein the first channel and the second channel are separated by the first offset.

2. The method of claim 1, wherein the first node of the first PAN is a first access point to one of the Internet or an intranet, and
wherein the first node of the second PAN is a second access point to one of the Internet or the intranet.

3. The method of claim 1, wherein the second node of the first PAN is one of:
an antenna;
a camera including at least a shelf within a field of view;
a cash register;
a climate control system;
a computer system;
a gate sensor;
an electronic label provided in association with the shelf, wherein the electronic label is configured to display a price of at least one item on the shelf;
a light;
a load sensor configured to sense a load on the shelf;
a motion sensor;
a power switch;
a proximity sensor;
a radiofrequency identification transmitter or receiver; or
a turnstile.

4. The method of claim 1, wherein each of the first channel hopping schedule and the second channel hopping schedule is in accordance with a medium access control protocol according to IEEE 802.15.4.

5. The method of claim 1, wherein a distance between the first node of the first PAN and the first node of the second PAN is less than an operational range of one of the first node of the first PAN or the first node of the second PAN.

6. The method of claim 1, wherein each of the first PAN and the second PAN is provided within a materials handling facility.

7. The method of claim 1, further comprising:
receiving, by a first node of a third PAN, one or more of:
the beacon transmitted by at least the first node of the first PAN during the first timeslot of the plurality of timeslots; or a beacon comprising information regarding the second channel hopping schedule transmitted by at least the first node of the second PAN during the first timeslot of the plurality of timeslots;
determining, by the first node of the third PAN, a second offset based at least in part on at least one of the information regarding the first channel hopping schedule or the information regarding the first channel hopping schedule;
establishing, by the first node of the third PAN, a third channel hopping schedule for the third PAN based at least in part on the first channel hopping schedule and the second offset, wherein the second channel hopping schedule comprises the plurality of timeslots and the plurality of channels; and
enabling communications between the first node of the third PAN and at least a second node of the third PAN in the first timeslot of the plurality of timeslots and in a third channel of the plurality of channels, wherein the first channel and the third channel are separated by the second offset, and
wherein the second offset is not the first offset.

8. The method of claim 1, wherein the plurality of channels comprises at least sixty-four channels, and
wherein each of the plurality of timeslots has a duration of approximately fifteen milliseconds.

9. The method of claim 1, wherein the second node of the first PAN is programmed with at least a first communication mode associated with a first quality-of-service or a first traffic requirement and a second communication mode associated with a second quality-of-service or a second traffic requirement, and
wherein the information regarding the first channel hopping schedule specifies one of the first communication mode or the second communication mode.

10. The method of claim 9, wherein the first communication mode comprises one of a first number of uplink slots between the first node of the first PAN and the second node of the first PAN or a first number of downlink slots between the first node of the first PAN and the second node of the first PAN within the first channel hopping schedule, and
wherein the second communication mode comprises one of a second number of uplink slots between the first node of the first PAN and the second node of the first PAN or a second number of downlink slots between the first node of the first PAN and the second node of the first PAN within the first channel hopping schedule.

11. The method of claim 9, wherein enabling the communications between the first node of the first PAN and at least the second node of the first PAN further comprises:
causing the second node of the first PAN to communicate with the first node of the first PAN in accordance with the first communication mode at a first time;
transmitting, by the first node of the first PAN to the second node of the first PAN, a first command message instructing the second node of the first PAN to communicate with the first node of the first PAN in accordance with the second communication mode at a second time, wherein the second time follows the first time; and
causing the second node of the first PAN to communicate with the first node of the first PAN in accordance with the second communication mode at a third time,
wherein the third time follows the second time.

12. A system comprising:
a first node of a first personal area network (PAN), wherein the first node of the first PAN comprises one or more processors that are configured to at least:
establish a first channel hopping schedule for the first PAN, wherein the first channel hopping schedule comprises a plurality of channels and a plurality of timeslots;
enable communications between the first node of the first PAN and at least a second node of the first PAN in a first timeslot of the plurality of timeslots and a first channel of the plurality of channels; and
transmit a beacon comprising information regarding the first channel hopping schedule, wherein the beacon is transmitted during at least a second timeslot of the plurality of timeslots; and
a first node of a second PAN, wherein the first node of the second PAN comprises one or more processors that are configured to at least:
receive the beacon transmitted by at least the first node of the first PAN during the second timeslot of the plurality of timeslots;
determine a first offset based at least in part on the information regarding the first channel hopping schedule;
establish a second channel hopping schedule for the second PAN based at least in part on the first channel hopping schedule and the first offset, wherein the second channel hopping schedule comprises the plurality of channels and the plurality of timeslots; and
enable communications between the first node of the second PAN and at least a second node of the second PAN in the first timeslot of the plurality of timeslots and in a second channel of the plurality of channels, wherein the first channel and the second channel are separated by the first offset.

13. The system of claim 12, wherein the first PAN further comprises a first plurality of devices,
wherein each of the first plurality of devices is one of a camera, a load sensor, or an electronic display,
wherein the second PAN further comprises a second plurality of devices,
wherein each of the second plurality of devices is one of a camera, a load sensor, or an electronic display, and
wherein a distance between the first node of the first PAN and the first node of the second PAN is less than an operational range of one of the first node of the first PAN or the first node of the second PAN.

14. The system of claim 13, wherein the first node of the first PAN is a coordinator of the first PAN, and
wherein the first node of the second PAN is a coordinator of the second PAN.

15. The system of claim 12, wherein each of the first channel hopping schedule and the second channel hopping schedule is in accordance with a medium access control protocol according to IEEE 802.15.4.

* * * * *